(12) United States Patent
Gingras et al.

(10) Patent No.: US 12,110,071 B2
(45) Date of Patent: Oct. 8, 2024

(54) TRACK FOR TRACTION OF A VEHICLE

(71) Applicant: Camso Inc., Magog (CA)

(72) Inventors: David Gingras, Magog (CA); Frederic Couture, Sherbrooke (CA)

(73) Assignee: CAMSO Inc., Magog (CA)

( * ) Notice: Subject to any disclaimer, the term of this patent is extended or adjusted under 35 U.S.C. 154(b) by 1241 days.

(21) Appl. No.: 16/639,374

(22) PCT Filed: Aug. 16, 2018

(86) PCT No.: PCT/CA2018/050996
§ 371 (c)(1),
(2) Date: Feb. 14, 2020

(87) PCT Pub. No.: WO2019/033215
PCT Pub. Date: Feb. 21, 2019

(65) Prior Publication Data
US 2020/0172182 A1  Jun. 4, 2020

Related U.S. Application Data

(60) Provisional application No. 62/546,270, filed on Aug. 16, 2017.

(51) Int. Cl.
*B62D 55/24* (2006.01)

(52) U.S. Cl.
CPC .................................. *B62D 55/244* (2013.01)

(58) Field of Classification Search
CPC ..... B62D 55/24; B62D 55/244; B62D 55/253
See application file for complete search history.

(56) References Cited

U.S. PATENT DOCUMENTS

| | | | | |
|---|---|---|---|---|
| 4,904,030 A | * | 2/1990 | Ono | B62D 55/202 |
| | | | | 305/174 |
| 10,435,091 B2 | * | 10/2019 | Tateishi | B62D 55/202 |
| 2002/0047306 A1 | | 4/2002 | Watanabe et al. | |
| 2008/0211301 A1 | | 9/2008 | Jee et al. | |
| 2010/0295367 A1 | | 11/2010 | Kim et al. | |
| 2014/0042801 A1 | | 2/2014 | Shomozono | |
| 2017/0151987 A1 | * | 6/2017 | Mizusawa | B62D 55/244 |
| 2018/0194409 A1 | * | 7/2018 | Tateishi | B62D 55/244 |

FOREIGN PATENT DOCUMENTS

| | | |
|---|---|---|
| EP | 2039597 | 3/2009 |
| EP | 3668780 | 6/2020 |
| JP | 200095158 | 4/2000 |

(Continued)

OTHER PUBLICATIONS

Communication issued on Mar. 17, 2021 in connection with European patent application No. 18,847,061.1, 2 pages.

(Continued)

*Primary Examiner* — Kip T Kotter
(74) *Attorney, Agent, or Firm* — Hahn Loeser & Parks LLP

(57) ABSTRACT

A track for traction of a vehicle (e.g., a compact track loader or other construction vehicle) which may be designed to enhance a resistance to wear of the track, including a resistance to cracking of elastomeric material of the track and a resistance to delamination of the elastomeric material of the track from cores at least partially embedded in the elastomeric material of the track.

34 Claims, 19 Drawing Sheets

(56) References Cited

FOREIGN PATENT DOCUMENTS

| NO | 2016200652 | 12/2016 | | |
|----|------------|---------|---|---|
| WO | 2017017957 | 2/2017 | | |
| WO | WO-2018186145 A1 * | 10/2018 | ........... | B62D 55/253 |
| WO | 2019033215 | 2/2019 | | |

OTHER PUBLICATIONS

Extended European Search Report issued Jun. 16, 2021, in connection with European Patent Application No. 18847061.1, 8 pages.
Written Opinion issued on Nov. 23, 2018 in connection with International Patent Application No. PCT/CA20185/050996, 6 pages.
International Search Report issued on Nov. 23, 2018 in connection with International Patent Application No. PCT/CA20185/050996, 4 pages.

* cited by examiner

TRACK FOR TRACTION OF A VEHICLE

CROSS-REFERENCE TO RELATED APPLICATION

This application is a national stage of International Application PCT/CA2018/050996 filed on Aug. 16, 2018 and claiming priority from U.S. Provisional Application 62/546,270 filed on Aug. 16, 2017, all of which are incorporated by reference herein.

FIELD

This disclosure generally relates to tracks for traction of vehicles, such as construction vehicles and other off-road vehicles.

BACKGROUND

Certain off-road vehicles, including industrial vehicles such as construction vehicles (e.g., loaders, excavators, bulldozers, pavers, telehandlers, etc.), agricultural vehicles (e.g., harvesters, combines, tractors, etc.), and forestry vehicles (e.g., feller-bunchers, tree chippers, knuckleboom loaders, etc.), for example, may be equipped with tracks which enhance their traction and floatation on soft, slippery and/or irregular grounds (e.g., soil, mud, sand, ice, snow, etc.) on which they operate.

A track of a track system of a vehicle may comprise elastomeric material (e.g., rubber) and cores embedded in its elastomeric material and spaced along and extending transversely to its longitudinal direction to impart transverse rigidity to the track and to drive and guide the track. As these cores may be metallic, the track may be a "metal-embedded rubber track" (MERT).

As the track is used, it is subject to various effects causing it to wear. For example, under loading of wheels of the track system and an environment of the vehicle, the elastomeric material of the track may crack. Grit (e.g., sand, rocks (e.g., gravel), and/or other small granular abrasive objects or other dirt, potentially contained in water and/or other liquid) may proceed to enter inside the track between its elastomeric material and its cores. This may cause the elastomeric material to delaminate from or otherwise lose adhesion to the cores, which may eventually render the track unusable.

For these and other reasons, there is a need to improve tracks for traction of vehicles.

SUMMARY

According to various aspects, this disclosure relates to a track for traction of a vehicle (e.g., a compact track loader or other construction vehicle) which may be designed to enhance a resistance to wear of the track, including a resistance to cracking of elastomeric material of the track and a resistance to delamination of the elastomeric material of the track from cores at least partially embedded in the elastomeric material of the track.

For example, in accordance with an aspect, this disclosure relates to a track for traction of a vehicle. The track is mountable around a plurality of wheels that includes a plurality of roller wheels for rolling on a bottom run of the track along a rolling path of the track. The track comprises: a ground-engaging outer side; an inner side opposite to the ground-engaging outer side; elastomeric material allowing the track to flex around the wheels; a plurality of cores at least partially embedded in the elastomeric material, distributed in a longitudinal direction of the track, and extending transversally to the longitudinal direction of the track; and a cracking inhibitor disposed along the rolling path and configured to inhibit cracking of the elastomeric material at the rolling path.

In accordance with another aspect, this disclosure relates to a track for traction of a vehicle. The track is mountable around a plurality of wheels that includes a plurality of roller wheels for rolling on a bottom run of the track along a rolling path of the track. The track comprises: a ground-engaging outer side; an inner side opposite to the ground-engaging outer side; elastomeric material allowing the track to flex around the wheels; a plurality of cores; and a plurality of crack-inhibiting elements. The cores are at least partially embedded in the elastomeric material, distributed in a longitudinal direction of the track, and extend transversally to the longitudinal direction of the track. The crack-inhibiting elements are spaced apart from one another in the longitudinal direction of the track, disposed between respective ones of the cores in the longitudinal direction of the track, and configured to inhibit cracking of the elastomeric material at the rolling path.

In accordance with another aspect, this disclosure relates to a track for traction of a vehicle. The track is mountable around a plurality of wheels that includes a plurality of roller wheels for rolling on a bottom run of the track along a rolling path of the track. The track comprises: a ground-engaging outer side; an inner side opposite to the ground-engaging outer side; elastomeric material allowing the track to flex around the wheels; a plurality of cores; and a plurality of recesses. The cores are at least partially embedded in the elastomeric material, distributed in a longitudinal direction of the track, and extend transversally to the longitudinal direction of the track. The recesses are spaced apart from one another in the longitudinal direction of the track and disposed between respective ones of the cores in the longitudinal direction of the track along the rolling path.

In accordance with another aspect, this disclosure relates to a track for traction of a vehicle. The track is mountable around a plurality of wheels that includes a plurality of roller wheels for rolling on a bottom run of the track along a rolling path of the track. The track comprises: a ground-engaging outer side; an inner side opposite to the ground-engaging outer side; elastomeric material allowing the track to flex around the wheels; and a plurality of cores. The cores are at least partially embedded in the elastomeric material, distributed in a longitudinal direction of the track, and extend transversally to the longitudinal direction of the track. Each core comprises a pair of wings extending in a longitudinal direction of the core, and a wheel engager disposed between the wings to engage the wheels. Each wing comprises a delamination inhibitor configured to inhibit delamination of the elastomeric material from the wing.

In accordance with another aspect, this disclosure relates to a track for traction of a vehicle. The track is mountable around a plurality of wheels that includes a plurality of roller wheels for rolling on a bottom run of the track along a rolling path of the track. The track comprises: a ground-engaging outer side; an inner side opposite to the ground-engaging outer side; elastomeric material allowing the track to flex around the wheels; and a plurality of cores. The cores are at least partially embedded in the elastomeric material, distributed in a longitudinal direction of the track, and extend transversally to the longitudinal direction of the track. Each core comprises a pair of wings extending in a longitudinal direction of the core and a wheel engager disposed between the wings to engage the wheels. Each wing comprises a grit blocker configured to impede passage of grit between an inner surface of the wing and a portion of the elastomeric material contiguous to the inner surface of the wing.

In accordance with another aspect, this disclosure relates to a track for traction of a vehicle. The track is mountable around a plurality of wheels that includes a plurality of roller wheels for rolling on a bottom run of the track along a rolling path of the track. The track comprises: a ground-engaging outer side; an inner side opposite to the ground-engaging outer side; elastomeric material allowing the track to flex around the wheels; and a plurality of cores. The cores are at least partially embedded in the elastomeric material, distributed in a longitudinal direction of the track, and extend transversally to the longitudinal direction of the track. Each core comprises a pair of wings extending in a longitudinal direction of the core and a wheel engager disposed between the wings to engage the wheels. Each wing comprises an inner surface facing the inner side of the track. The inner surface of the wing comprises an unevenness in a longitudinal direction of the core.

In accordance with another aspect, this disclosure relates to a track for traction of a vehicle. The track is mountable around a plurality of wheels that includes a plurality of roller wheels for rolling on a bottom run of the track along a rolling path of the track. The track comprises: a ground-engaging outer side; an inner side opposite to the ground-engaging outer side; elastomeric material allowing the track to flex around the wheels; and a plurality of cores. The cores are at least partially embedded in the elastomeric material, distributed in a longitudinal direction of the track, and extend transversally to the longitudinal direction of the track. Each core comprises a pair of wings extending in a longitudinal direction of the core, and a wheel engager disposed between the wings to engage the wheels. Each wing comprises a shear limiter configured to oppose shearing of a portion of the elastomeric material contiguous to an inner surface of the wing relative to the inner surface of the wing under loading from respective ones of the roller wheels.

These and other aspects of this disclosure will now become apparent to those of ordinary skill in the art upon review of the following description of embodiments in conjunction with the accompanying drawings.

BRIEF DESCRIPTION OF THE DRAWINGS

A detailed description of embodiments is provided below, by way of example only, with reference to the accompanying drawings, in which.

It is to be expressly understood that the description and drawings are only for the purpose of illustrating certain embodiments and are an aid for understanding. They are not intended to be limitative.

DETAILED DESCRIPTION OF EMBODIMENTS

Figure 1:
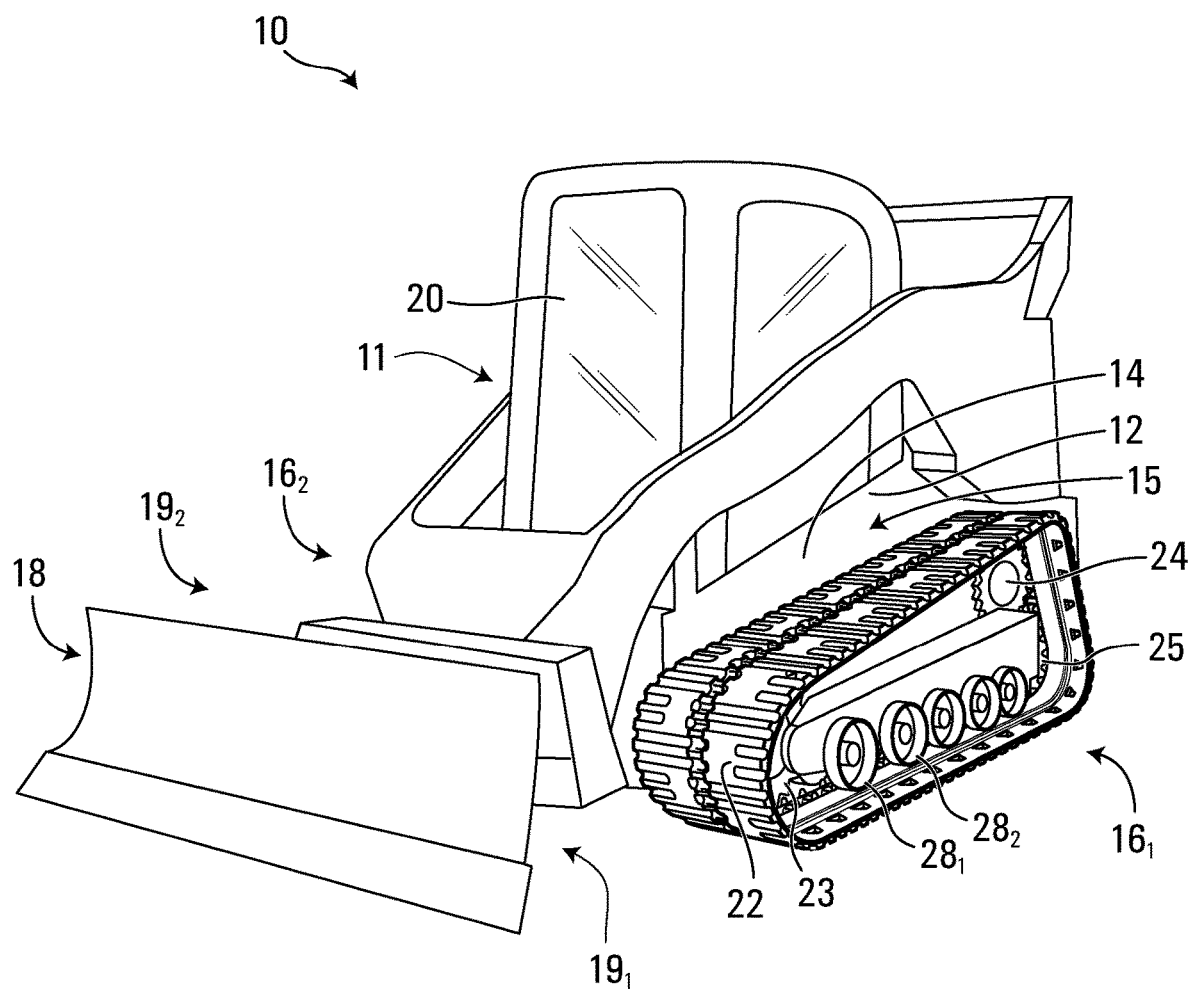
FIG. 1 shows an example of an embodiment of a vehicle comprising track systems.

FIG. 1 shows an example of an embodiment of a vehicle 10 comprising track systems $16_1$, $16_2$. Each of the track systems $16_1$, $16_2$ comprises a track 22 to engage the ground. In this embodiment, the vehicle 10 is a heavy-duty work vehicle for performing construction, agricultural, or other industrial work or military work. More particularly, in this embodiment, the vehicle 10 is a construction vehicle. Specifically, in this example, the construction vehicle 10 is a compact track loader. The vehicle 10 comprises a frame 12, a powertrain 15, and an operator cabin 20 for an operator to move the vehicle 10 on the ground to perform work using a work implement 18.

As further discussed below, in this embodiment, the track 22 of each of the track systems $16_1$, $16_2$ may be designed to enhance a resistance to wear of the track 22, including a resistance to cracking of elastomeric material of the track 22 and a resistance to delamination of the elastomeric material of the track 22 from cores at least partially embedded in the elastomeric material of the track 22.

The powertrain 15 is configured to generate motive power for the track systems $16_1$, $16_2$ to propel the vehicle 10 on the ground. To that end, the powertrain 15 comprises a prime mover 14 which is a source of motive power that comprises one or more motors.

For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). Motive power generated by the prime mover 14 is applied to the track systems $16_1$, $16_2$. In some embodiments, the powertrain 15 may transmit power from the prime mover 14 to the track systems $16_1$, $16_2$ (e.g., via a transmission, a differential, and/or any other suitable mechanism). In other embodiments, at least part of the powertrain 15 (e.g., a motor and/or a transmission) may be part of one or more of the track systems $16_1$, $16_2$.

The operator cabin 20 comprises a user interface 11 that allow the operator to interact with the vehicle 10, including to steer the vehicle 10 on the ground, use the work implement 18, and control other aspects of the vehicle 10. For example, the user interface 11 comprises an accelerator, a brake control, and a steering device that can be used by the operator to control motion of the vehicle 10 on the ground, as well as controls to operate the work implement 18. The user interface 11 may also comprise an instrument panel (e.g., a dashboard) which provides indicators (e.g., a speedometer indicator, a tachometer indicator, etc.) to convey information to the operator.

The work implement 18 is operable to perform work. In this embodiment, the work implement 18 comprises a bucket for moving soil, debris or other material. In this example, the vehicle 10 comprises support arms $19_1$, $19_2$ carrying the work implement 18 and mounted to a rear part of the frame 12 so that they extend forwardly pass the operator cabin 20. In other embodiments, the work implement 18 may comprise a dozer blade, a backhoe, a fork, a grapple, a scraper pan, an auger, a saw, a ripper, a material-handling arm, or any other type of work implement.

Figure 2:
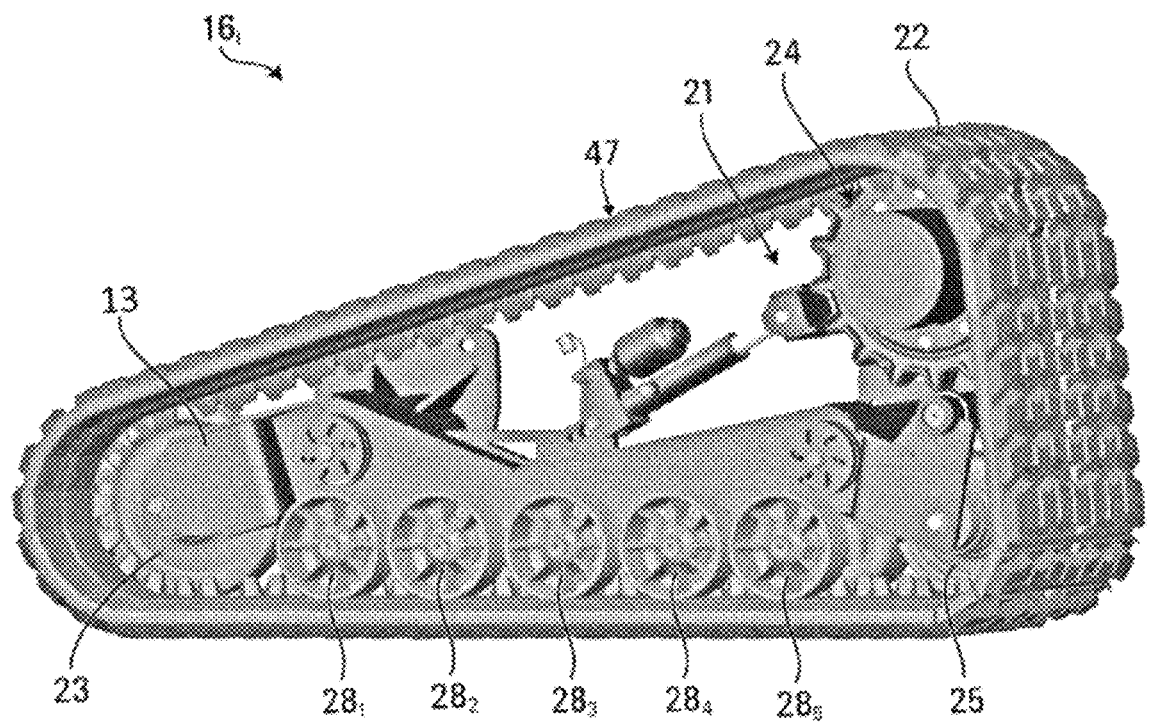
FIG. 2 shows a perspective of a track system of the vehicle.
Figure 3:
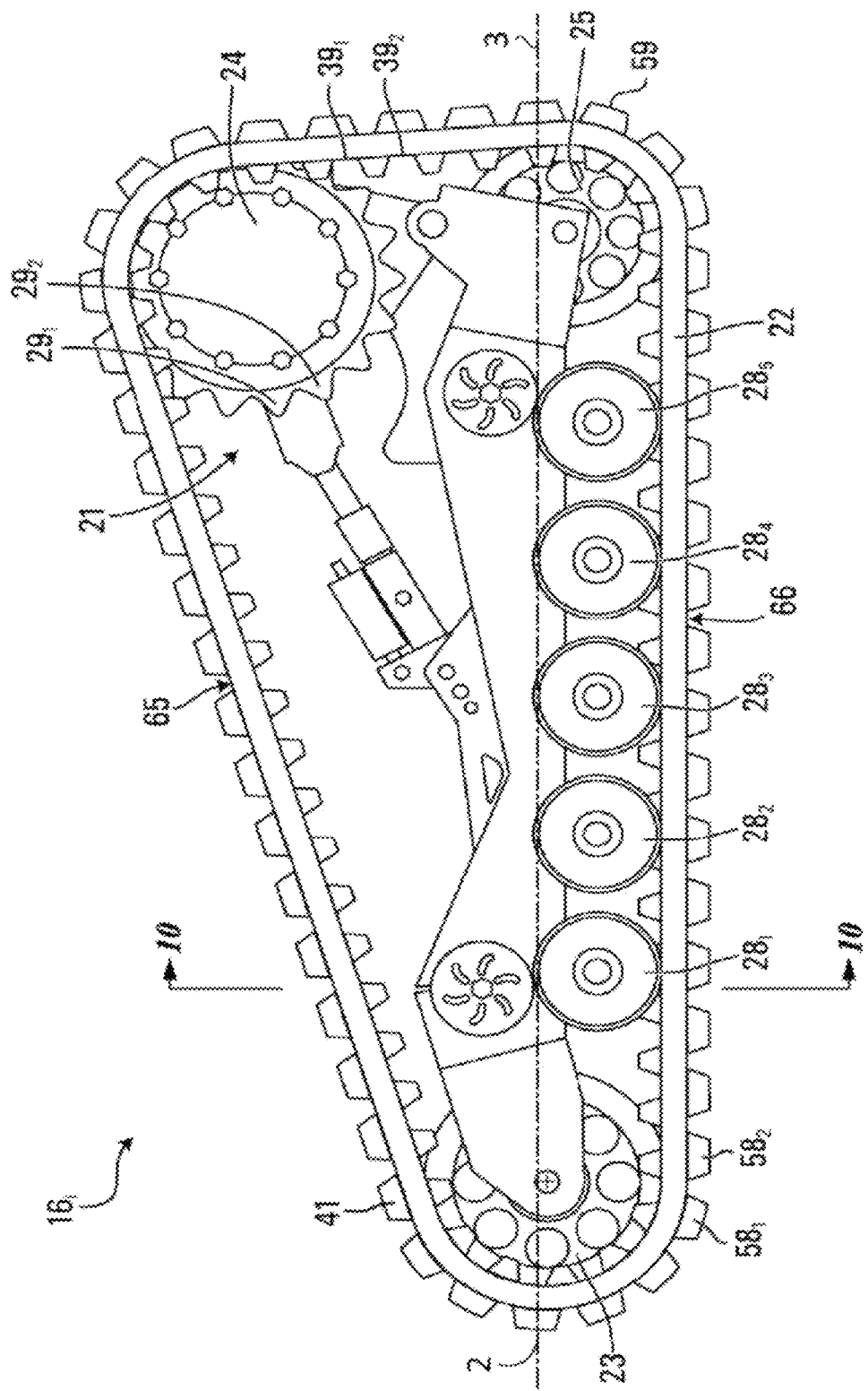
FIG. 3 shows a side view of the track system of the vehicle.

The track systems $16_1$, $16_2$ engage the ground to propel the vehicle 10. With additional reference to FIGS. 2 to 3, each track system $16_i$ comprises a track-engaging assembly 21 and the track 22 disposed around the track-engaging assembly 21. In this embodiment, the track-engaging assembly 21 comprises a plurality of wheels which, in this example, includes a drive wheel 24 and a plurality of idler wheels that includes a front (i.e., leading) idler wheel 23, a rear (i.e., trailing) idler wheel 25, and roller wheels $28_1$-$28_{10}$. The track system $16_i$ also comprises a frame 13 which supports various components of the track system $16_i$, including the wheels 24, 23, 25, $28_1$-$28_{10}$. In this embodiment, the vehicle 10 can be steered by operating the track systems $16_1$, $16_2$ differently, such as by moving their tracks 22 at different speeds and/or in different directions.

The track system $16_i$ has a longitudinal direction and a front longitudinal end 2 and a rear longitudinal end 3 that define a length of the track system $16_i$ along a longitudinal axis 61 that defines the longitudinal direction of the track system $16_i$. The track system $16_i$ has a widthwise direction and a width that is defined by a width $W_T$ of the track 22. The track system $16_i$ also has a heightwise direction that is normal to its longitudinal and widthwise directions.

The track 22 engages the ground to provide traction to the vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 4 to 6, the track 22 comprises an inner side 45, a ground-engaging outer side 47, and lateral edges 491, 492.

The inner side 45 faces the wheels 24, 23, 25, $28_1$-$28_{10}$, while the ground-engaging outer side 47 engages the ground. A top run 65 of the track 22 extends between the longitudinal ends 2, 3 of the track system 16; and over the wheels 24, 23, 25, $28_1$-$28_{10}$, whereas a bottom run 66 of the track 22 extends between the longitudinal ends 2, 3 of the track system 16; and under the wheels 24, 23, 25, $28_1$-$28_{10}$. The bottom run 66 of the track 22 defines an area of contact 63 of the track 22 with the ground which generates traction and bears a majority of a load on the track system $16_i$, and which will be referred to as a "contact patch" of the track 22 with the ground. The track 22 has a longitudinal axis 17 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thicknesswise direction normal to its longitudinal and widthwise directions.

The track 22 is elastomeric, i.e., comprises elastomeric material 32, to be flexible around the track-engaging assembly 21. The elastomeric material 32 of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material 32 of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 32 which allows the carcass 36 to elastically change in shape and thus the track 22 to flex as it is in motion around the track-engaging assembly 21.

In this embodiment, a plurality of cores $44_1$-$44_N$ are at least partially embedded in the elastomeric material 32 of the carcass 36. The cores $44_1$-$44_N$ are distributed along and extend transversally to the longitudinal direction of the track 22 to impart transverse rigidity to the track 22. The cores $44_1$-$44_N$ may also help to drive the track 22 by engagement with the drive wheel 24 and/or guide the track 22 by contacting the wheels 23, 25, $28_1$-$28_{10}$ as the track 22 is driven by the drive wheel 24.

Each core $44_i$ has a longitudinal axis 81 extending transversally to the longitudinal axis 17 of the track 22 and defining a longitudinal direction of the core $44_i$. In this example, the longitudinal axis 81 of the core $44_i$ extends perpendicularly to the longitudinal axis 17 of the track 22, such that it is oriented in the widthwise direction of the track 22. In this embodiment, the core $44_i$ has a length which is shorter than the width of the track 22 such that it has longitudinal ends $4_1$, $4_2$ that are spaced apart from the lateral edges 491, 492 of the track 22. The core $44_i$ also has a widthwise direction and a thicknesswise direction that are normal to its longitudinal direction.

More particularly, in this embodiment, the core $44_i$ comprises a pair of wings $51_1$, $51_2$ (i.e., extensions) and a wheel engager 53 disposed between the wings $51_1$, $51_2$.

The wings $51_1$, $51_2$ are elongated along the longitudinal axis 81 of the core $44_i$ to impart transverse rigidity to the track 22. Each of the wings $51_1$, $51_2$ has an inner surface 33 oriented towards the inner side 45 of the track 22 and an outer surface 34 oriented towards the ground-engaging outer side 47 of the track 22. In this embodiment, each of the wings $51_1$, $51_2$ has a tapered shape whereby its inner surface 33 and its outer surface 34 converge towards one another toward a given one of the longitudinal ends $4_1$, $4_2$ of the core $44_i$. The wings $51_1$, $51_2$ may have any other shape in other embodiments.

Figure 7:
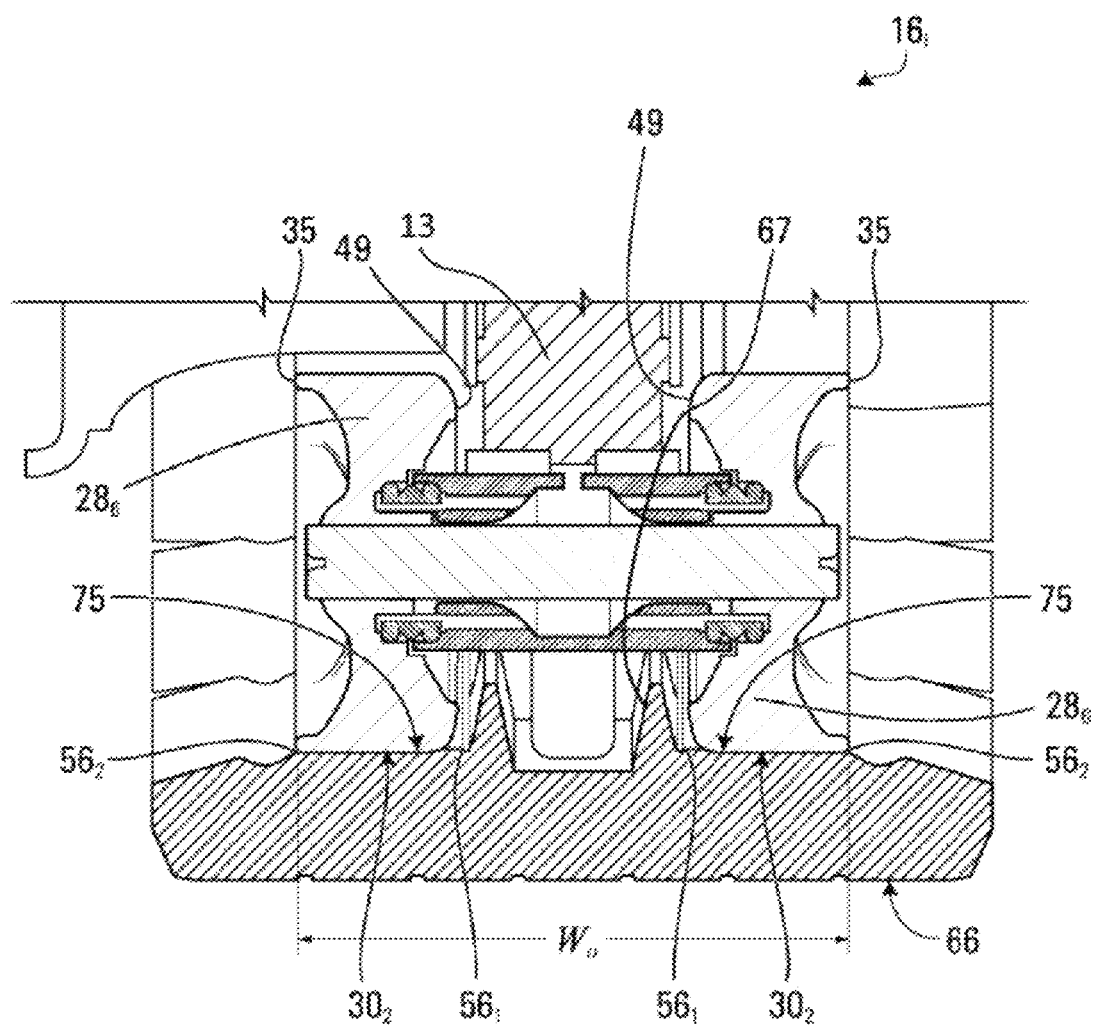
FIGS. 7 and 8 show cross-sectional views of a portion of the track system, including a frame and roller wheels of the track system.
Figure 8:
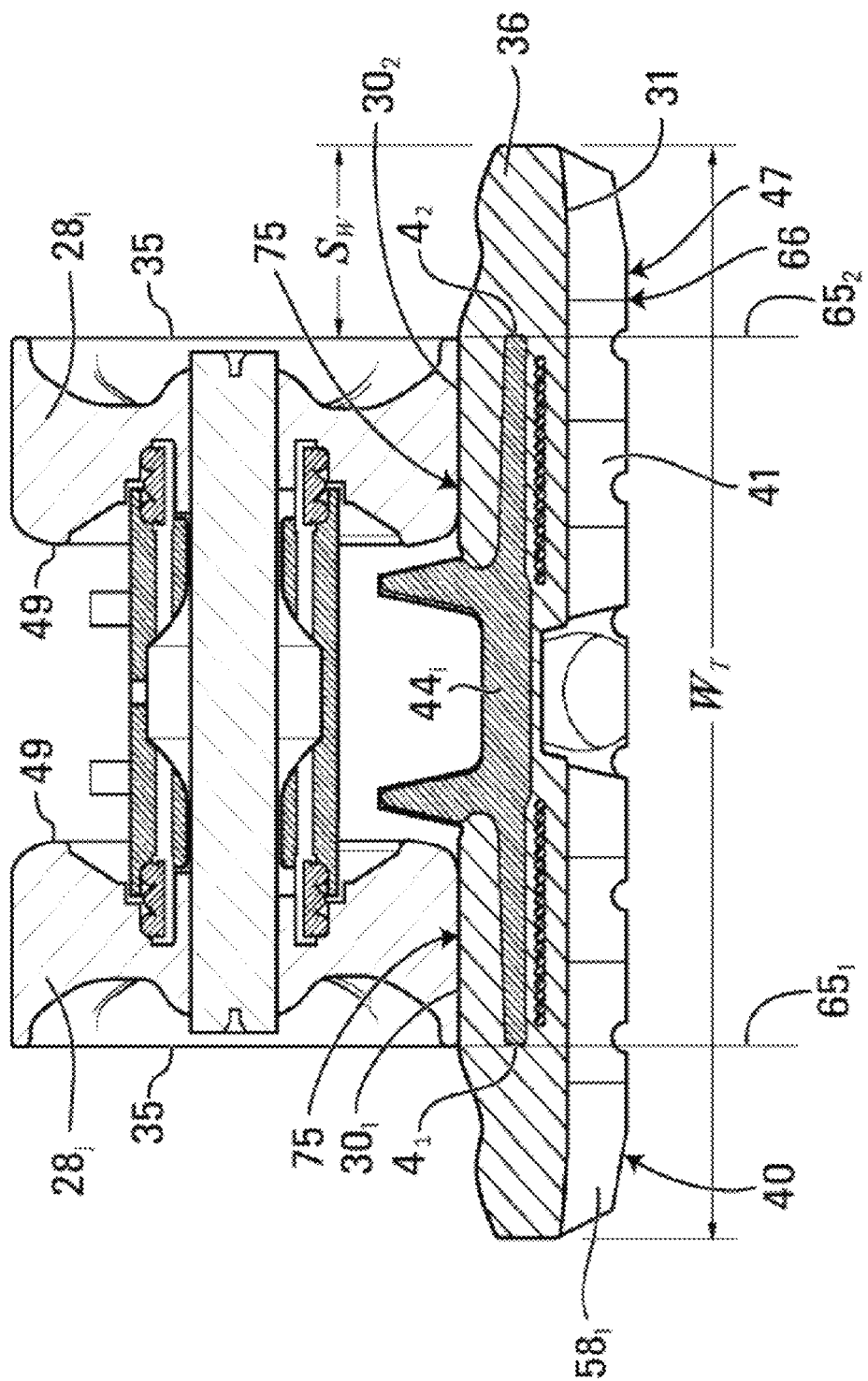

Referring additionally to FIGS. 7 and 8, it can be seen that the longitudinal ends $4_1$ and $4_2$ of the core $44_i$ can be aligned at axes $65_1$ and $65_2$ with the outer lateral surfaces 35 of the roller wheels $28_i$ and $28_j$. The two longitudinal ends $4_1$ and $4_2$ may therefore define a width $W_o$ in the widthwise direction of the track 22. The endless body 36 of the track 22 may have a width $S_w$ that is projected in the widthwise direction of the track 22 from the axis $65_1$ or $65_2$.

The wheel engager 53 is configured to engage respective ones of the wheels 23, 25, $28_1$-$28_{10}$ as the track 22 is driven by the drive wheel 24. More particularly, in this embodiment, the wheel engager 53 comprises a drive portion 52 for engaging the drive wheel 24 to drive the track 22 and a wheel guide 54 that projects on the inner side 45 of the track 22 for contacting the roller wheels $28_1$-$28_{10}$ to help guide the track 22. In this example, the wheel guide 54 comprises a pair of guide projections $57_1$, $57_2$ that project on the inner side 45 of the track 22. Each guide projection $57_i$ comprises a top end 60, a base 61, and a pair of wheel-facing sides $62_1$, $62_2$ opposite one another and extending from its base 61 to its top end 60. The wheel engager 53 may be configured in various other ways in other embodiments (e.g., it may comprise only one guide projection or more than two (2) guide projections, etc.).

The core $44_i$ may be made in any suitable way. In this embodiment, the core $44_i$, including its wings $51_1$, $51_2$ and its wheel engager 53, is made of metallic material. More particularly, in this embodiment, the core $44_i$ may be made of steel formed into shape by casting. The core $44_i$ may have various other shapes, may comprise various other components, may be made of various other materials (e.g., polymers, ceramics, composites, etc.), and/or may be made using various other processes (e.g., forging, welding, fastening, etc.) in other embodiments.

In this embodiment, the carcass 36 comprises a layer of reinforcing cables $37_1$-$37_M$ that are adjacent to one another and extend generally in the longitudinal direction of the track 22 to enhance strength in tension of the track 22 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible along the cable's longitudinal axis (e.g., fibers or wires of metal, plastic or composite material).

Also, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the cores $44_1$-$44_N$, the reinforcing cables $37_1$-$37_M$, and the layer of reinforcing fabric 43.

The inner side 45 of the track 22 comprises an inner surface 55 of the carcass 36 and a plurality of wheel-contacting projections $48_1$-$48_N$ that project from the inner surface 55 and are positioned to contact respective ones of the wheels 23, 25, $28_1$-$28_{10}$ to do at least one of guiding the track 22 and driving (i.e., imparting motion to) the track 22. Since each of them is used to do at least one of guiding the track 22 and driving the track 22, the wheel-contacting projections $48_1$-$48_N$ can be referred to as "guide/drive projections". In this embodiment, each guide/drive projection $48_i$ interacts with respective ones of the idler wheels 23, 25, $28_1$-$28_{10}$ to guide the track 22 to maintain proper track alignment and prevent de-tracking without being used to drive the track 22, in which case the guide/drive projection $48_i$ is a guide projection. In other embodiments, a guide/drive projection $48_i$ may interact with the drive wheel 24 to drive the track 22, in which case the guide/drive projection $48_i$ is a drive projection. In yet other embodiments, a guide/drive projection $48_i$ may both (i) interact with the drive wheel 24 to drive the track and (ii) interact with respective ones of the idler wheels 23, 25, $28_1$-$28_{10}$ to guide the track 22 to maintain proper track alignment and prevent de-tracking, in which case the guide/drive projection $48_i$ is both a drive projection and a guide projection.

In this embodiment, each guide projection $48_i$ comprises elastomeric material 67 overlying a given one of the guide projections $57_1$, $57_2$ of the cores $44_1$-$44_N$. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide projection $48_i$. The elastomeric material 67 of the guide projection $48_i$ may be provided on the inner side 45 of the track 22 in various ways. For example, in this embodiment, the elastomeric material 67 of the guide projection $48_i$ is provided by being molded with the carcass 36.

The inner side 45 of the track 22 comprises rolling paths $30_1$, $30_2$ on which the roller wheels $28_1$-$28_{10}$ roll to apply the bottom run 66 of the track 22 onto the ground. For example, a peripheral surface 75 of each roller wheel $28_i$ between an outer lateral surface 35 and an inner lateral surface 49 of the roller wheel $28_i$ is in rolling contact with a given one of the rolling paths $30_1$, $30_2$ of the track 22. Each of the rolling paths $30_1$, $30_2$ of the track 22 comprises an inner lateral edge $56_1$ and an outer lateral edge $56_2$ that define a width $W_{rp}$ of that rolling path.

The ground-engaging outer side 47 of the track 22 comprises a ground-engaging outer surface 31 of the carcass 36 and a tread pattern 40 to enhance traction on the ground. The tread pattern 40 comprises a plurality of traction projections $58_1$-$58_T$ projecting from the ground-engaging outer surface 31, spaced apart in the longitudinal direction of the track 22 and engaging the ground to enhance traction. The traction projections $58_1$-$58_T$ may be referred to as "tread projections" or "traction lugs". The traction lugs $58_1$-$58_T$ may have any suitable shape (e.g., curved shapes, shapes with straight parts and curved parts, etc.).

In this embodiment, each traction lug $58_i$ is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer).

The traction lugs $58_1$-$58_T$ may be provided on the ground-engaging outer side 47 of the track 22 in various ways. For example, in this embodiment, the traction lugs $58_1$-$58_T$ are provided on the ground-engaging outer side 47 of the track 22 by being molded with the carcass 36.

The drive wheel 24 is rotatable by power derived from the powertrain 15 to drive the track 22. In this embodiment, the drive wheel 24 is a drive sprocket comprising a plurality of drive members $29_1$, $29_D$ spaced apart circumferentially to engage the drive portion 52 of each of the cores $44_1$-$44_N$ in order to drive the track 22 (e.g., a "positive drive" arrangement). In this example, the track 22 comprises drive voids $39_1$, $39_V$ (e.g., recesses or holes) to receive the drive members $29_1$, $29_D$ of the drive wheel 24.

The idler wheels 23, 25, $28_1$-$28_{10}$ are not driven by power supplied by the powertrain 15, but are rather used to do at least one of supporting part of a weight of the vehicle 10 on the ground via the track 22, guiding the track 22 as it is driven by the drive wheel 24, and tensioning the track 22. More particularly, in this embodiment, the front and rear idler wheel 23, 25 maintain the track 22 in tension and help to support part of the weight of the vehicle 10 on the ground via the track 22. The roller wheels $28_1$-$28_{10}$ roll on the rolling paths $30_1$, $30_2$ of the track 22 along the bottom run 66 of the track 22 to apply it onto the ground.

The track 22 may be designed to enhance its resistance to wear, including its resistance to cracking and its resistance to delamination of its elastomeric material 32 from its cores $44_1$-$44_N$. Examples of features that the track 22 may have in this regard in some embodiments are discussed below.

1. Cracking Inhibition

Figure 4:
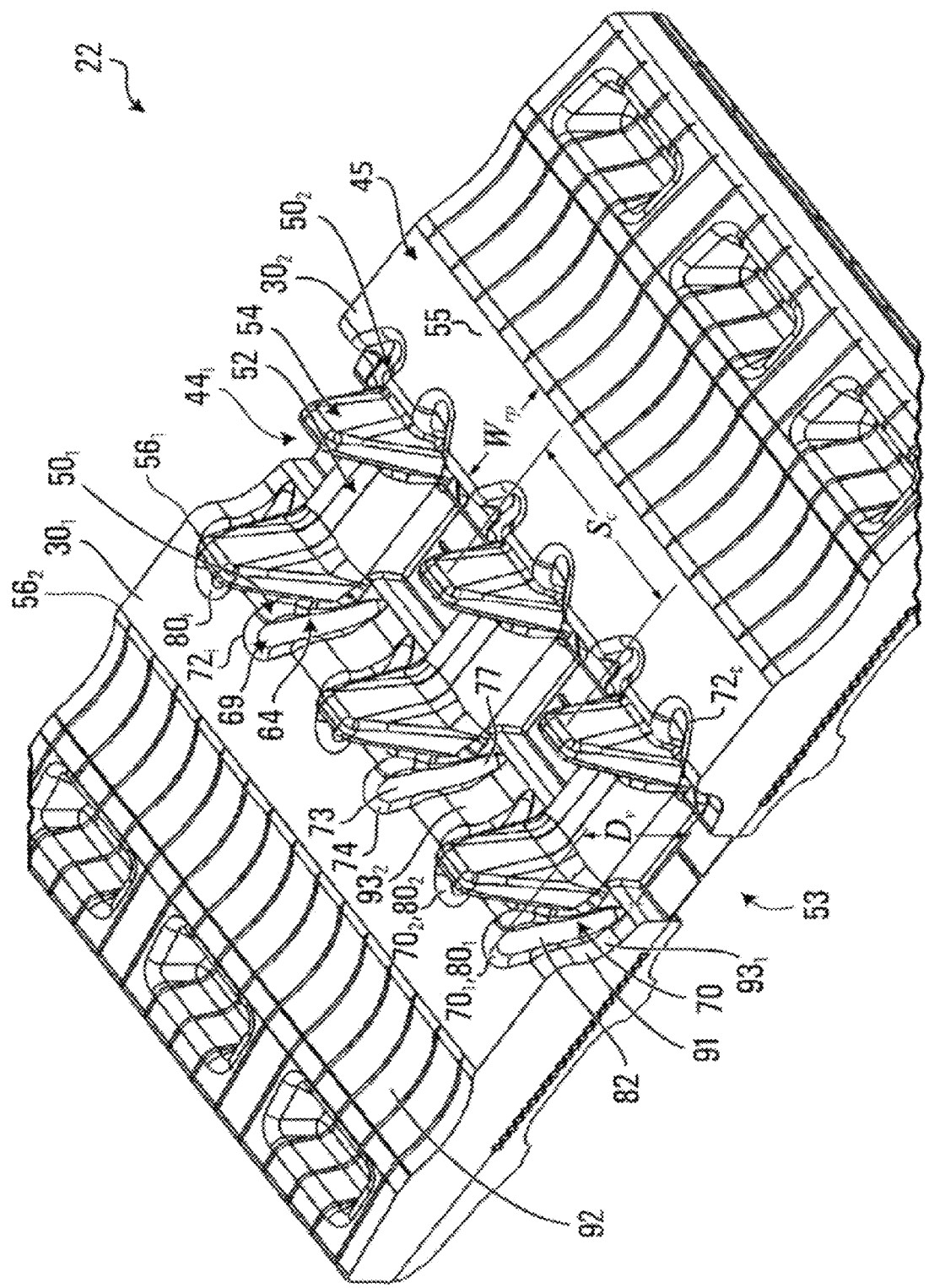
FIGS. 4 to 6 respectively show a perspective cross-sectional view, an inner view and a cross-sectional view of part of a track of the track system.
Figure 5:
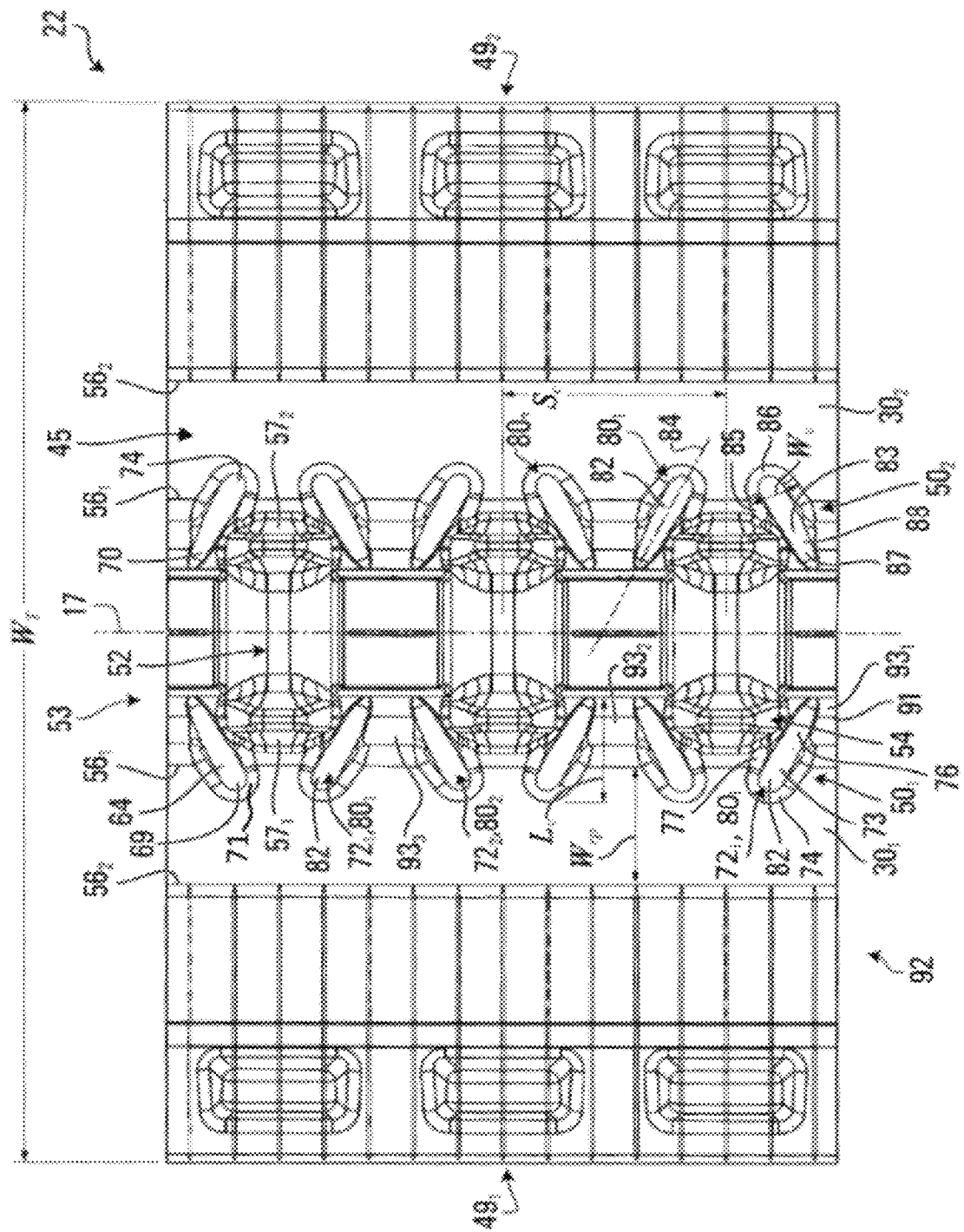
Figure 6:
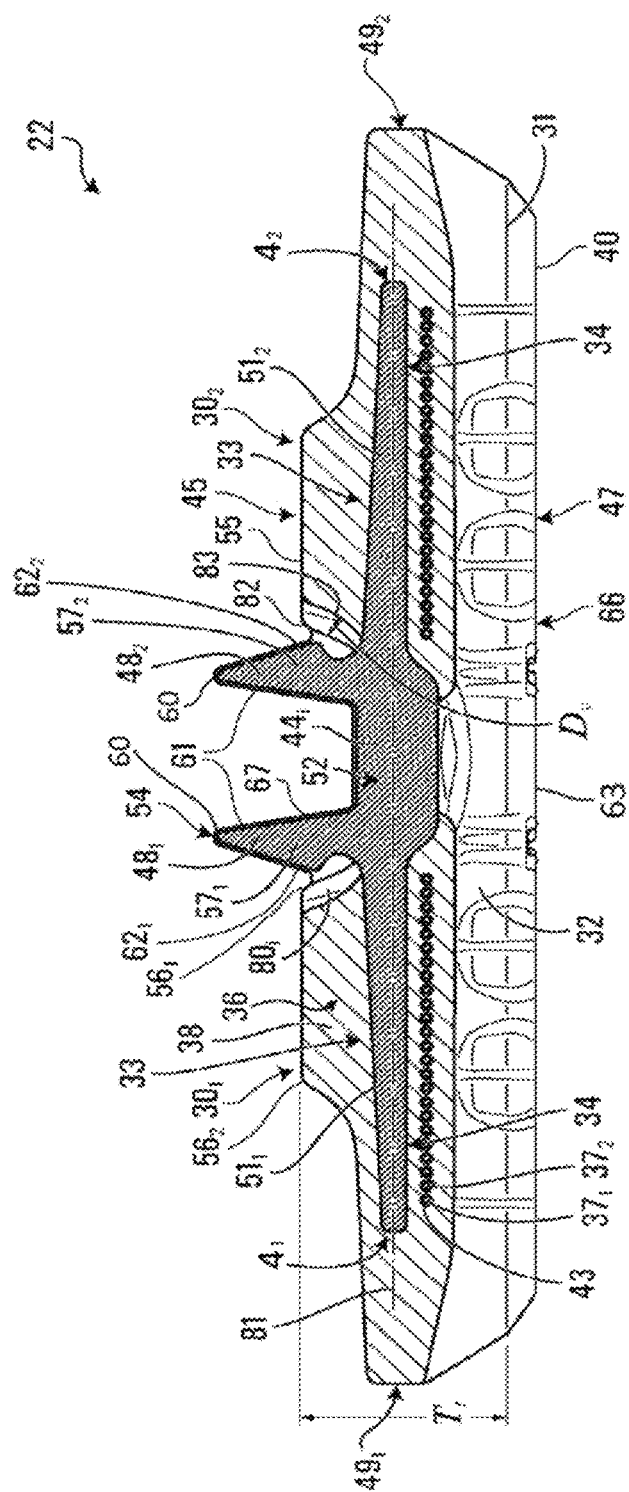

In some embodiments, as shown in FIG. 4 to 6, the track 22 may comprise cracking inhibitors $50_1$, $50_2$ configured to inhibit cracking of the elastomeric material 32 of the track 22 at the rolling paths $30_1$, $30_2$ of the track 22. Each of the cracking inhibitors $50_1$, $50_2$ is a structure disposed along a given one of the rolling paths $30_1$, $30_2$ and designed to at least reduce (i.e., reduce or prevent) cracking of the elastomeric material 32 of the track 22 at the given one of the rolling paths $30_1$, $30_2$ of the track 22 by at least reducing (i.e., reducing or preventing) crack initiation and/or crack propagation where that cracking inhibitor is located.

The cracking inhibitor $50_1$ for the rolling path $30_1$ of the track 22 will be further discussed below, with an understanding that a similar discussion applies to the cracking inhibitor $50_2$ for the rolling path $30_2$ of the track 22.

As further discussed below, in this embodiment, the cracking inhibitor $50_1$ is configured to reduce tension and compression of the elastomeric material 32 of the track 22 at the rolling path $30_1$ of the track 22 as the roller wheels $28_1$-$28_{10}$ move away and towards respective ones of the cores $44_1$-$44_N$. This may help to reduce or prevent cracking of the elastomeric material 32 of the track 22, such as cracking that may otherwise tend to occur rapidly near the wheel guide 54 of each of the cores $44_1$-$44_N$ and propagate laterally outwards.

In this embodiment, at least part of the cracking inhibitor $50_1$ is located between the drive portion 52 of each of the cores $44_1$-$44_N$ and the outer lateral edge $56_2$ of the rolling path $30_1$ in the widthwise direction of the track 22. More particularly, in this embodiment, at least part of the cracking inhibitor $50_1$ is located between the wheel guide 54 of each of the cores $44_1$-$44_N$ and the outer lateral edge $56_2$ of the rolling path $30_1$ in the widthwise direction of the track 22. In this example, at least part of the cracking inhibitor $50_i$ is located between the guide projection $57_1$ of each of the cores $44_1$-$44_N$ that is adjacent to the rolling path $30_1$ and the outer lateral edge $56_2$ of the rolling path $30_1$ in the widthwise direction of the track 22. In this case, at least part of the cracking inhibitor $50_i$ is located in the rolling path $30_1$, i.e., between the inner lateral edge $56_1$ and the outer lateral edge $56_2$ of the rolling path $30_1$ in the widthwise direction of the track 22.

Thus, in this embodiment, a portion 64 of the cracking inhibitor $50_i$ is located between the wheel guide 54 of each of the cores $44_1$-$44_N$ and the outer lateral edge $56_2$ of the rolling path $30_1$ in the widthwise direction of the track 22. Here, the portion 64 of the cracking inhibitor $50_1$ is located between the guide projection $57_1$ of each of the cores $44_1$-$44_N$ and the outer lateral edge $56_2$ of the rolling path $30_1$ in the widthwise direction of the track 22. This includes a portion 69 of the cracking inhibitor $50_1$ that is located in the rolling path $30_1$, i.e., between the inner lateral edge $56_1$ and the outer lateral edge $56_2$ of the rolling path $30_1$ in the widthwise direction of the track 22.

More particularly, in this embodiment, the cracking inhibitor $50_1$ is adjacent to the inner lateral edge $56_1$ of the rolling path $30_1$, i.e., closer to the inner lateral edge $56_1$ of the rolling path $30_1$ than to the outer lateral edge $56_2$ of the rolling path $30_1$ in the widthwise direction of the track 22. Also, in this embodiment, the cracking inhibitor $50_1$ overlaps with the wheel guide 54 of each of the cores $44_1$-$44_N$ in the widthwise direction of the track 22. Here, the cracking inhibitor $50_1$ overlaps with the guide projection $57_1$ of each of the cores $44_1$-$44_N$ in the widthwise direction of the track 22. A portion 70 of the cracking inhibitor $50_i$ is thus aligned with the wheel guide 54 of each of the cores $44_1$-$44_N$, in this case the guide projection $57_1$ of each of the cores $44_1$-$44_N$, in the widthwise direction of the track 22. Furthermore, in this embodiment, the cracking inhibitor $50_1$ overlaps with each of the cores $44_1$-$44_N$ in the longitudinal direction of the track 22. A portion 71 of the cracking inhibitor $50_i$ is thus aligned with each of the cores $44_1$-$44_N$ in the longitudinal direction of the track 22.

The cracking inhibitor $50_1$ may be implemented in any suitable way. In this embodiment, the cracking inhibitor $50_1$ comprises a plurality of crack-inhibiting elements $72_1$-$72_C$ distributed along the rolling path $30_1$ of the track 22. More particularly, in this embodiment, the crack-inhibiting elements $72_1$-$72_C$ are spaced apart from one another in the longitudinal direction of the track 22. Also, plural ones (in this case, two) of the crack-inhibiting elements $72_1$-$72_C$ are disposed along the rolling path $30_1$ between successive ones of the cores $44_1$-$44_N$ that succeed one another in the longitudinal direction of the track 22.

Each crack-inhibiting element $72_i$ is configured to at least reduce cracking of the elastomeric material 32 of the track 22 at the rolling path $30_1$ by at least reducing crack initiation and/or crack propagation where the crack-inhibiting element $72_i$ is located.

In this embodiment, at least part of the crack-inhibiting element $72_i$ is located between the drive portion 52 of an adjacent one of the cores $44_1$-$44_N$ and the outer lateral edge $56_2$ of the rolling path $30_1$ in the widthwise direction of the track 22. More particularly, in this embodiment, at least part of the crack-inhibiting element $72_i$ is located between the wheel guide 54 of the adjacent one of the cores $44_1$-$44_N$ and the outer lateral edge $56_2$ of the rolling path $30_1$ in the widthwise direction of the track 22. In this example, at least part of the crack-inhibiting element $72_i$ is located between the guide projection $57_1$ of the adjacent one of the cores $44_1$-$44_N$ and the outer lateral edge $56_2$ of the rolling path $30_1$ in the widthwise direction of the track 22. In this case, at least part of the crack-inhibiting element $72_i$ is located in the rolling path $30_1$, i.e., between the inner lateral edge $56_1$ and the outer lateral edge $56_2$ of the rolling path $30_1$ in the widthwise direction of the track 22.

Thus, in this embodiment, a portion 73 of the crack-inhibiting element $72_i$ is located between the wheel guide 54 of the adjacent one of the cores $44_1$-$44_N$ and the outer lateral edge $56_2$ of the rolling path $30_1$ in the widthwise direction of the track 22. Here, the portion 73 of the crack-inhibiting element $72_i$ is located between the guide projection $57_1$ of the adjacent one of the cores $44_1$-$44_N$ and the outer lateral edge $56_2$ of the rolling path $30_1$ in the widthwise direction of the track 22. This includes a portion 74 of the crack-inhibiting element $72_i$ that is located in the rolling path $30_1$, i.e., between the inner lateral edge $56_1$ and the outer lateral edge $56_2$ of the rolling path $30_1$ in the widthwise direction of the track 22. As such, in this example, the portions 73 of the crack-inhibiting elements $72_1$-$72_C$ collectively constitute the portion 64 of the cracking inhibitor $50_i$ that is located between the wheel guide 54 of each of the cores $44_1$-$44_N$ and the outer lateral edge $56_2$ of the rolling path $30_1$ in the widthwise direction of the track 22, and the portions 74 of the crack-inhibiting elements $72_1$-$72_C$ collectively constitute the portion 69 of the cracking inhibitor $50_1$ that is located in the rolling path $30_1$.

More particularly, in this embodiment, the crack-inhibiting element $72_i$ is adjacent to the inner lateral edge $56_1$ of the rolling path $30_1$, i.e., closer to the inner lateral edge $56_1$ of the rolling path $30_1$ than to the outer lateral edge $56_2$ of the rolling path $30_1$ in the widthwise direction of the track 22. Also, in this embodiment, the crack-inhibiting element $72_i$ overlaps with the wheel guide 54 of the adjacent one of the cores $44_1$-$44_N$ in the widthwise direction of the track 22. Here, the crack-inhibiting element $72_i$ overlaps with the guide projection $57_1$ of the adjacent of the cores $44_1$-$44_N$ in the widthwise direction of the track 22. A portion 76 of the crack-inhibiting element $72_i$ is thus aligned with the wheel guide 54 of the adjacent one of the cores $44_1$-$44_N$, in this case the guide projection $57_1$ of the adjacent one of the cores $44_1$-$44_N$, in the widthwise direction of the track 22. Furthermore, in this embodiment, the crack-inhibiting element $72_i$ overlaps with the adjacent one of the cores $44_1$-$44_N$ in the longitudinal direction of the track 22. A portion 77 of the crack-inhibiting element $72_i$ is thus aligned with the adjacent one of the cores $44_1$-$44_N$ in the longitudinal direction of the track 22. Accordingly, in this example, the portions 76 of the crack-inhibiting elements $72_1$-$72_C$ collectively constitute the portion 70 of the cracking inhibitor $50_i$ that is aligned with the wheel guide 54 of each of the cores $44_1$-$44_N$ in the widthwise direction of the track 22, and the portions 77 of the crack-inhibiting elements $72_1$-$72_C$ collectively constitute the portion 71 of the cracking inhibitor $50_i$ that is aligned with each of the cores $44_1$-$44_N$ in the longitudinal direction of the track 22.

In this embodiment, the rolling path $30_1$ is elevated relative to an inner lower area 91 and an outer lower area 92 of the inner side 45 of the track 22 between which it is disposed in the widthwise direction of the track 22, such that the crack-inhibiting element $72_i$ is located in the inner lower area 91 of the inner side 45 of the track 22. More particularly, in this embodiment, the inner lower area 91 of the inner side 45 of the track 22 comprises depressions $93_1$-$93_D$ between respective ones of the cores $44_1$-$44_N$ and at least part of the crack-inhibiting element $72_i$ is located in a given one of the depressions $93_1$-$93_D$.

The crack-inhibiting elements $72_1$-$72_C$ may be implemented in any suitable way. In this embodiment, the crack-inhibiting elements $72_1$-$72_C$ are stress relievers $80_1$-$80_C$, i.e., each crack-inhibiting element $72_i$ is a respective one of the stress relievers $80_1$-$80_C$.

Each of the stress relievers $80_1$-$80_C$ is configured to relieve stress in the elastomeric material 32 of the track 22 at the rolling path $30_1$ where that stress reliever is located as respective ones of the roller wheels $28_1$-$28_{10}$ pass by. In this embodiment, each of the stress relievers $80_1$-$80_C$ is configured to reduce tensile or compressive stress of the elastomeric material 32 of the track 22 at the rolling path $30_1$ where that stress reliever is located as the roller wheels $28_1$-$28_{10}$ move away from or towards an adjacent one of the cores $44_1$-$44_N$. More particularly, in this embodiment, each of the stress relievers $80_1$-$80_C$ is configured to facilitate elastic deformation of the elastomeric material 32 of the track 22 at the rolling path $30_1$ where it is located in order to effect this stress reduction. In turn, this may help to reduce or prevent cracking of the elastomeric material 32 of the track 22. Notably, in this example, as they are near the wheel guide 54 of each of the cores $44_1$-$44_N$, the stress relievers $80_1$-$80_C$ may help to reduce or prevent cracking that may otherwise tend to occur rapidly at such locations and propagate laterally outwards.

For example, in this embodiment, considering stress relievers $80_x$, $80_y$ that are disposed between cores $44_x$, $44_y$ that succeed one another in the longitudinal direction of the track 22, when a given one of the roller wheels $28_1$-$28_{10}$ rolling on the rolling path $30_1$ moves away from the core $44_x$ and towards the core $44_y$, the stress reliever $80_x$ helps to reduce tensile stress in the elastomeric material 32 of the track 22 and the stress reliever $80_y$ helps to reduce compressive stress in the elastomeric material 32 of the track 22.

Each stress reliever $80_i$ may be implemented in any suitable way. In this embodiment, the stress reliever $80_i$ comprises a void 82 defined by the elastomeric material 32 of the track 22. An absence of material at the void 82 may facilitate elastic deformation of the elastomeric material 32 of the track 22 that defines the void 82, thus relieving stress in the elastomeric material 32, which may help to reduce or prevent cracking of the elastomeric material 32.

In this embodiment, the void 82 of the stress reliever $80_i$ is a recess. More particularly, in this embodiment, the recess 82 is elongated, i.e., a groove. In this example, the groove 82 is elongated transversally to the longitudinal direction of the track 22. That is, a longitudinal axis 84 of the groove 82 extends transversally to the longitudinal direction of the track 22. In this case, the grooves 82 of four of the stress relievers $80_1$-$80_C$ between successive ones of the cores $44_1$-$44_N$ can be viewed as being arranged in an X-shaped configuration. Also, in this example, as it is at least partially located in the given one of the depressions $93_1$-$93_D$ of the inner side 45 of the track 22, the groove 82 forms an even further lowering of the inner lower area 91 of the inner side 45 of the track 22.

More particularly, in this embodiment, a portion 85 of the groove 82 of the stress reliever $80_i$ is located between the wheel guide 54 of the adjacent one of the cores $44_1$-$44_N$ and the outer lateral edge $56_2$ of the rolling path $30_1$ in the widthwise direction of the track 22. Here, the portion 85 of the groove 82 is located between the guide projection $57_1$ of the adjacent one of the cores $44_1$-$44_N$ and the outer lateral edge $56_2$ of the rolling path $30_1$ in the widthwise direction of the track 22. This includes a portion 86 of the groove 82 that is located in the rolling path $30_1$, i.e., between the inner lateral edge $56_1$ and the outer lateral edge $56_2$ of the rolling path $30_1$ in the widthwise direction of the track 22. Also, in this embodiment, a portion 87 of the groove 82 is aligned with the wheel guide 54 of the adjacent one of the cores $44_1$-$44_N$, in this case the guide projection $57_1$ of the adjacent one of the cores $44_1$-$44_N$, in the widthwise direction of the track 22, and a portion 88 of the groove 82 is aligned with the adjacent one of the cores $44_1$-$44_N$ in the longitudinal direction of the track 22.

A depth $D_v$ of the groove 82 of the stress reliever $80_i$, measured normal to a bottom surface 83 of the groove 82, may be set as desired. For example, in some embodiments, the depth $D_v$ of the groove 82 may be at least 5%, in some cases at least 10%, in some cases at least 20%, in some cases at least 40%, and in some cases at least 60% of a thickness $T_t$ of the track 22 between the inner surface 55 and the ground-engaging outer surface 31 of the track 22, and/or the depth Dv of the groove 82 may be no more than 60%, in some cases no more than 40%, in some cases no more than 20%, and in some cases no more than 10% of the thickness $T_t$ of the track 22. For instance, in some embodiments, the depth $D_v$ of the groove 82 may be at least 5 mm, in some cases at least 10 mm, in some cases at least 15 mm, and in some cases at least 20 mm, and/or the depth $D_v$ of the groove 82 may be no more than 25 mm, in some cases no more than 20 mm, in some cases no more than 15 mm, and in some cases no more than 10 mm. The depth $D_v$ of the groove 82 may have any other suitable value in other embodiments.

In this embodiment, the depth $D_v$ of the groove 82 varies along the longitudinal axis 84 of the groove 82. More particularly, in this embodiment, the depth $D_v$ of the groove 82 is greater at the portion 85 of the groove 82 located between the guide projection $57_1$ of the adjacent one of the cores $44_1$-$44_N$ and the outer lateral edge $56_2$ of the rolling path $30_1$ in the widthwise direction of the track 22 than at the portion 87 of the groove 82 aligned with the guide projection $57_1$ of the adjacent one of the cores $44_1$-$44_N$ in the widthwise direction of the track 22.

A width $W_v$ of the groove 82 of the stress reliever $80_i$ may be set as desired. For example, in some embodiments, the width $W_v$ of the groove 82 may be at least 10%, in some cases at least 20%, in some cases at least 30%, and in some cases at least 40% of a spacing $S_c$ (i.e., a pitch) of the successive ones of the cores $44_1$-$44_N$ between which the groove 82 is located in the longitudinal direction of the track 22, and/or the width $W_v$ of the groove 82 may be no more than 40%, in some cases no more than 30%, in some case no more than 20%, and in some cases no more than 10% of the spacing $S_c$ of the successive ones of the cores $44_1$-$44_N$. For instance, in some embodiments, the width $W_v$ of the groove 82 may be at least 1 mm, in some cases at least 20 mm, and in some cases 50 mm, and/or the width $W_v$ of the groove 82 may be no more than 50 mm, in some cases no more than 20 mm, and in some cases no more than 1 mm. The width $W_v$ of the groove 82 may have any other suitable value in other embodiments.

In this embodiment, the width $W_v$ of the groove 82 of the stress reliever $80_i$ varies along the longitudinal axis 84 of the groove 82. More particularly, in this embodiment, the width $W_v$ of the groove 82 is greater at the portion 85 of the groove 82 located between the guide projection $57_1$ of the adjacent one of the cores $44_1$-$44_N$ and the outer lateral edge $56_2$ of the rolling path $30_1$ in the widthwise direction of the track 22 than at the portion 87 of the groove 82 aligned with the guide projection $57_1$ of the adjacent one of the cores $44_1$-$44_N$ in the widthwise direction of the track 22.

A dimension $L_v$ of the groove 82 of the stress reliever $80_i$ in the widthwise direction of the track 22 may be set as desired. For example, in some embodiments, the dimension $L_v$ of the groove 82 in the widthwise direction of the track 22 may be at least 5%, in some cases at least 10%, in some cases at least 20%, and in some cases at least 50% of the width $W_{rp}$ of the rolling path $30_1$, and/or the dimension $L_v$ of the groove 82 may be no more than 50%, in some cases no more than 20%, and in some case no more than 10% of the width $W_{rp}$ of the rolling path $30_1$. For instance, in some embodiments, the dimension $L_v$ of the groove 82 in the widthwise direction of the track 22 may be at least 5 mm, in some cases at least 20 mm, and in some cases 100 mm, and/or the dimension $L_v$ of the groove 82 may be no more than 100 mm, in some cases no more than 20 mm, and in some cases no more than 1 mm. The dimension $L_v$ of the groove 82 in the widthwise direction of the track 22 may have any other suitable value in other embodiments.

The groove 82 of the stress reliever $80_i$ may be formed by the elastomeric material 32 of the track 22 during manufacturing of the track 22 in any suitable manner. In this embodiment, the groove 82 may be molded during molding of the elastomeric material 32 of the track 22 (i.e., a molded groove). In other embodiments, the groove 82 may be formed after molding of the elastomeric material 32 of the track 22 by removing elastomeric material that was molded, such as by cutting, carving, etc.

The resistance to cracking of the elastomeric material 32 of the track 22 where the cracking inhibitor $50_1$ is located may thus be greater than if the cracking inhibitor $50_1$ was omitted but the track 22 was otherwise identical (i.e., the cracking inhibitor $50_1$ was replaced with elastomeric material identical to that contiguous to it). For example, in some embodiments, a crack growth rate where the cracking inhibitor $50_1$ is located may be less than if the cracking inhibitor $50_1$ was omitted but the track 22 was otherwise identical. For instance, in some embodiments, the crack growth rate where the cracking inhibitor $50_1$ is located may at least 10% lower, in some cases at least 20% lower, and in some cases at least 50% lower than if the cracking inhibitor $50_1$ was omitted but the track 22 was otherwise identical. As another example, in some embodiments, a crack initiation time where the cracking inhibitor $50_1$ is located may be longer than if the cracking inhibitor $50_1$ was omitted but the track 22 was otherwise identical. For instance, in some embodiments, the crack initiation time where the cracking inhibitor $50_1$ is located, expressed as a number of cycles before a crack is initiated where the cracking inhibitor $50_1$ is located, may at least 50% longer, in some cases at least 100% longer, in some cases at least 200% longer, and in some cases at least 500% longer than if the cracking inhibitor $50_1$ was omitted but the track 22 was otherwise identical.

The cracking inhibitor $50_1$ may be implemented in various other ways in other embodiments.

For instance, in some embodiments, each stress reliever $80_i$ may be implemented in various other manners. For example, in some embodiments, the recess 82 of the stress reliever $80_i$ may have any other shape in other embodiments (e.g., the groove 82 may be curved, partly curved and partly straight, etc., along its longitudinal axis 84; the recess 82 may not be elongated; etc.). As another example, in some embodiments, the void 82 of the stress reliever $80_i$ may be a hole extending through the track 22 from the inner side 45 to the ground-engaging outer side 47 of the track 22.

Figure 9:
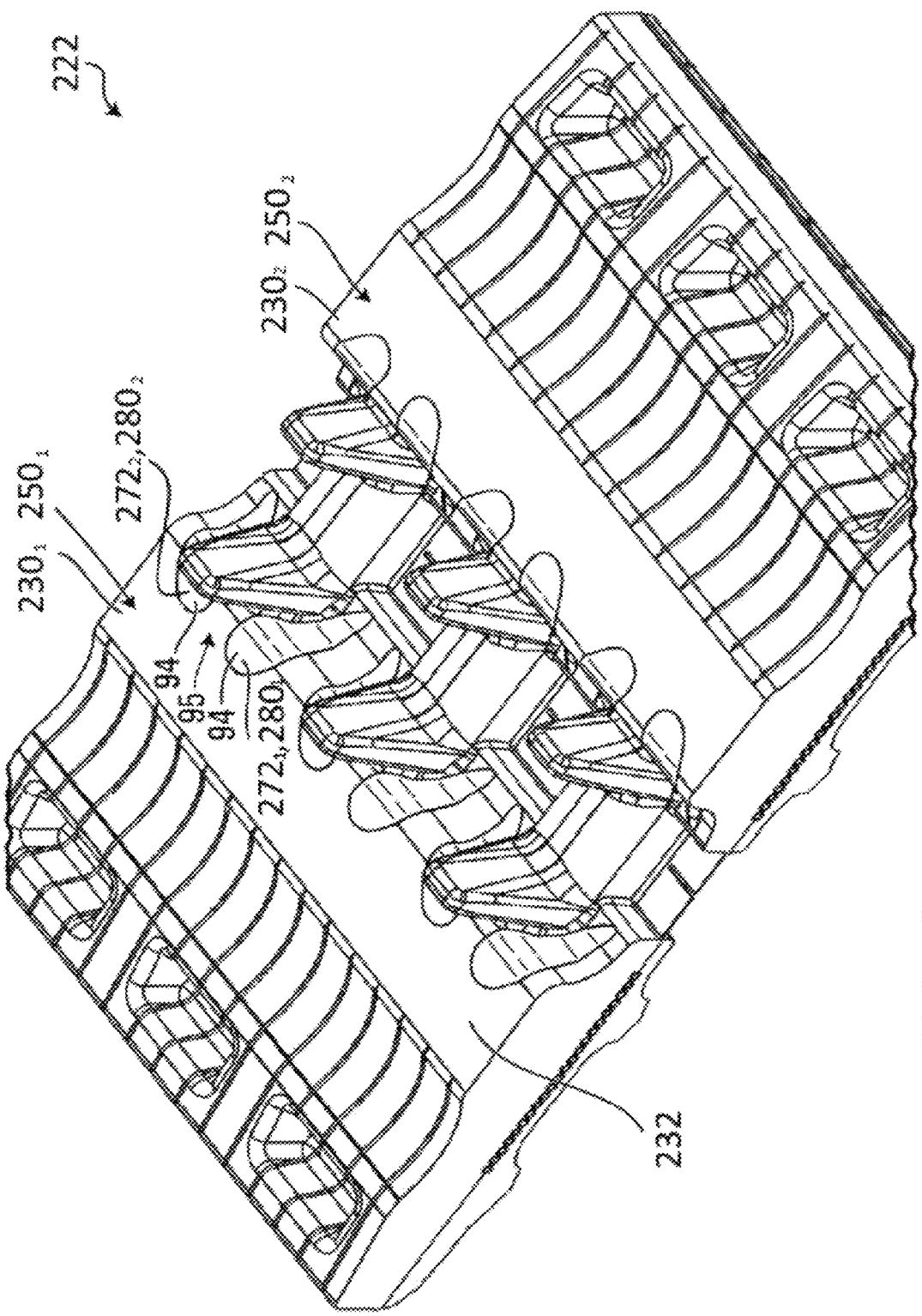
FIGS. 9 to 11 show an example of another embodiment of the track.
Figure 10:
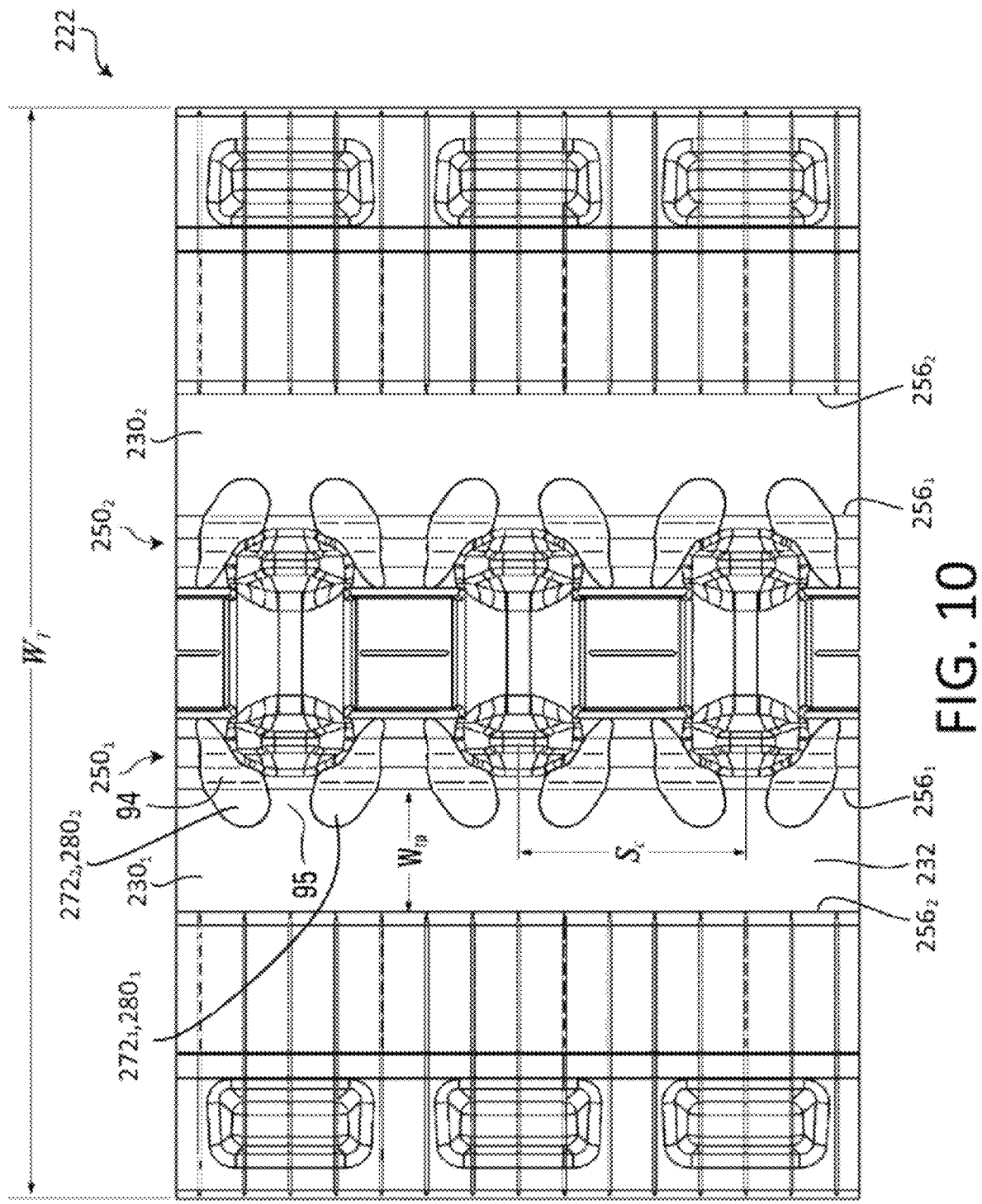
Figure 11:
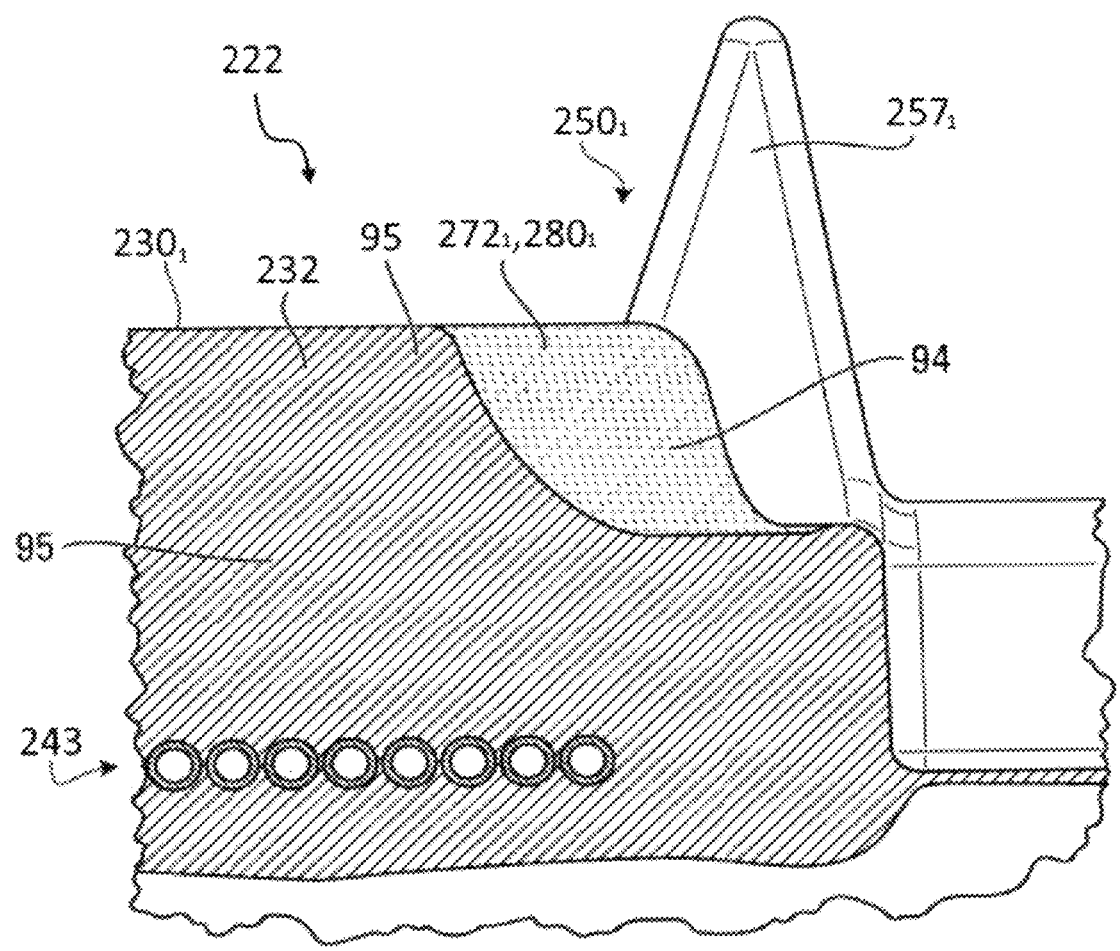

In some embodiments, as shown in FIGS. 9 to 11, the stress reliever $280_i$ may comprise deformable material 94 that is more easily deformable, such as more elastic and/or softer, than a portion 95 of the elastomeric material 232 of the track 222 contiguous to the deformable material 94. This may facilitate elastic deformation where the stress reliever $280_i$ is located, which may help to reduce or prevent cracking. The crack-inhibiting elements $272_1$, $272_2$ and the stress relievers $280_1$, $280_2$ are disposed along the rolling path $230_1$, $230_2$ of the cracking inhibitors $250_1$, $250_2$ respectively. The inner lateral edges $256_1$ and outer lateral edges $256_2$ are also comprised in the track 222. The track 222 includes inner lateral edges $256_1$ and outer lateral edges $256_2$. Also shown is the guide projection $257_1$.

The deformable material 94 may be implemented in any suitable way. In this embodiment, the deformable material 94 is elastomeric material. For instance, in some embodiments, the deformable material 94 may be a foam rubber or another soft rubber, a polyurethane foam, etc.

For example, in some embodiments, a modulus of elasticity (i.e., Young's modulus) of the deformable material 94 may be lower than a modulus of elasticity of the portion 95 of the elastomeric material 232 of the track 222. For instance, in some embodiments, the modulus of elasticity of the deformable material 94 may be no more than 90%, in some cases no more than 80%, and in some cases no more than 50% of the modulus of elasticity of the portion 95 of the elastomeric material 232 of the track 222. Alternatively or additionally, in some embodiments, a hardness of the deformable material 94 may be lower than a hardness of the portion 95 of the elastomeric material 232 of the track 222. For instance, in some embodiments, when on a same hardness scale (e.g., Shore durometers), the hardness of the deformable material 94 may be no more than 90%, in some cases no more than 80%, and in some cases no more than 50% of the hardness of the portion 95 of the elastomeric material 232 of the track 222.

Figure 12:
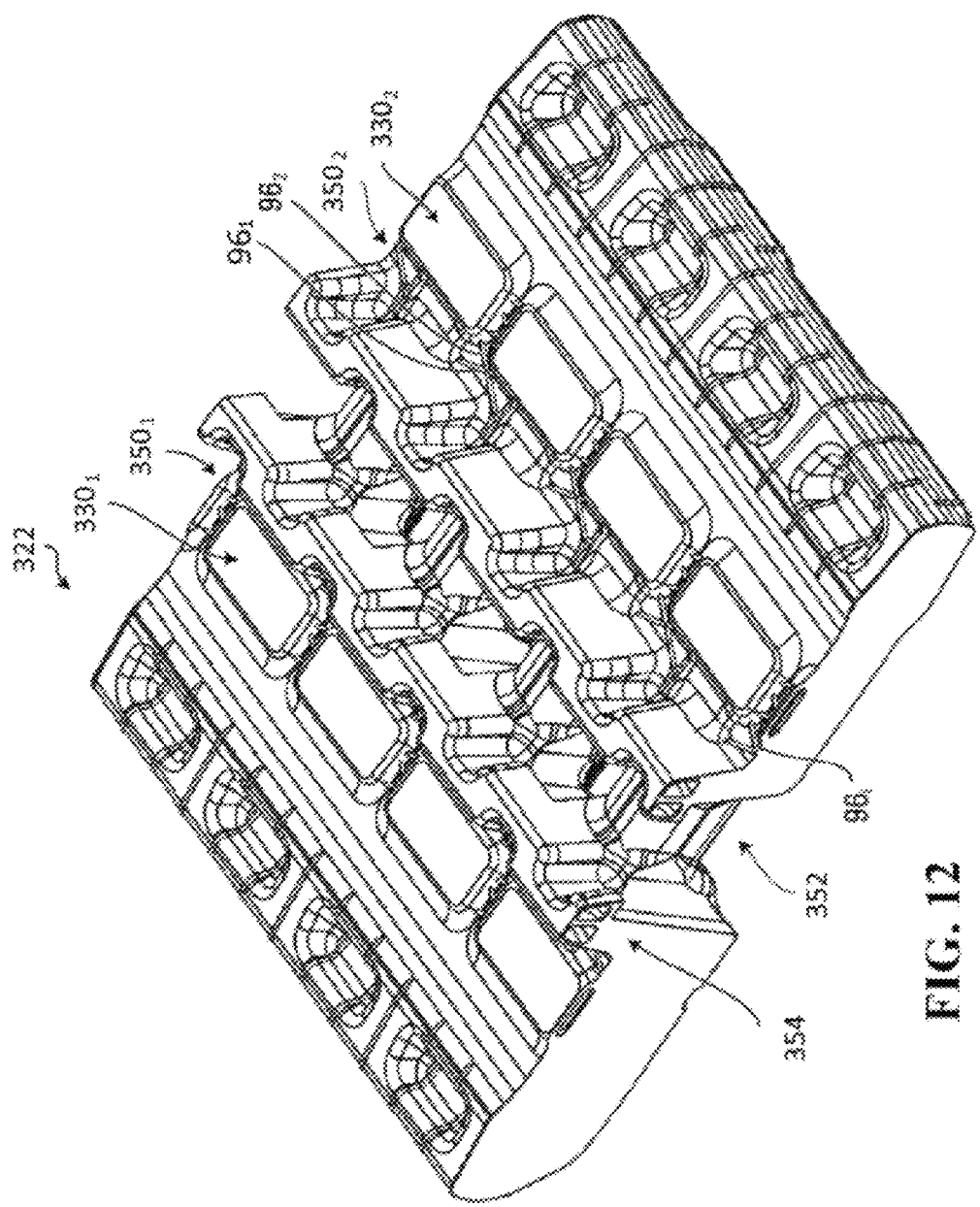
FIGS. 12 to 14 show an example of another embodiment of the track.
Figure 13:
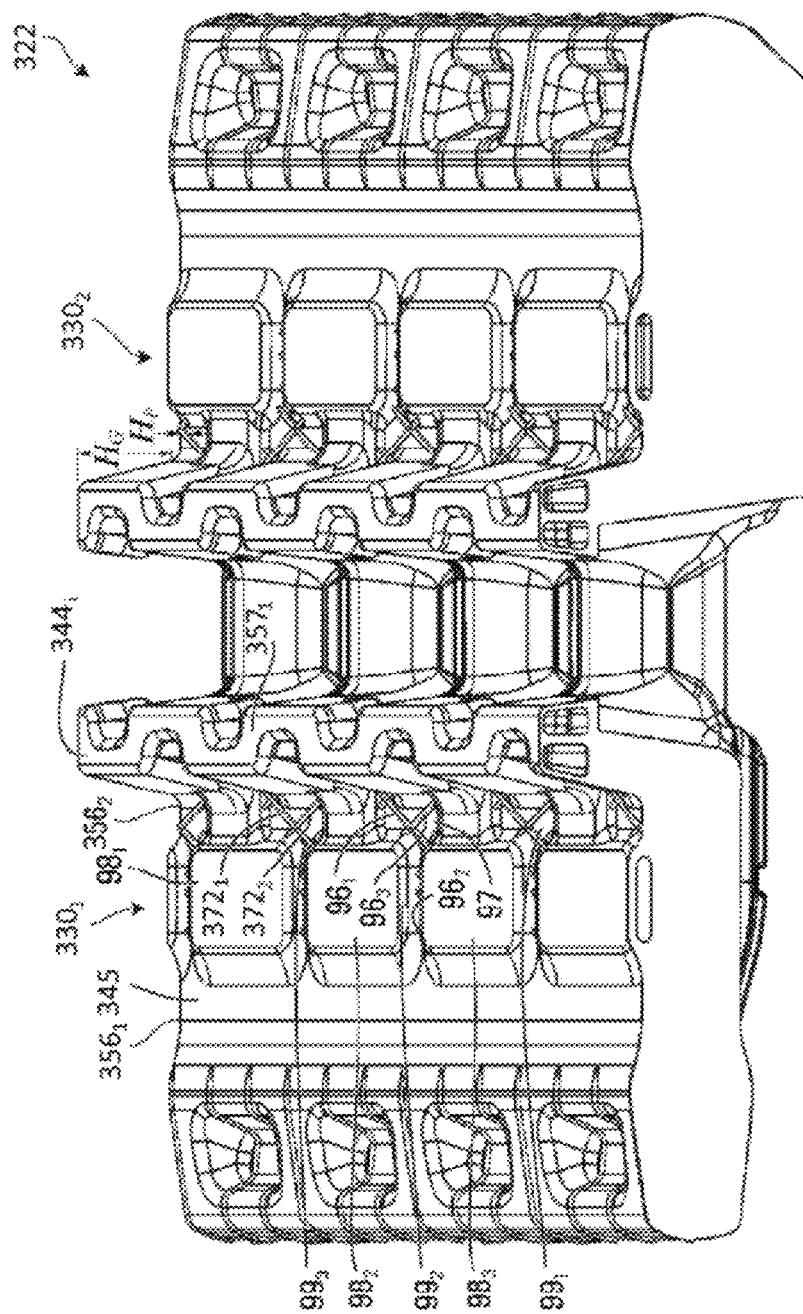
Figure 14:
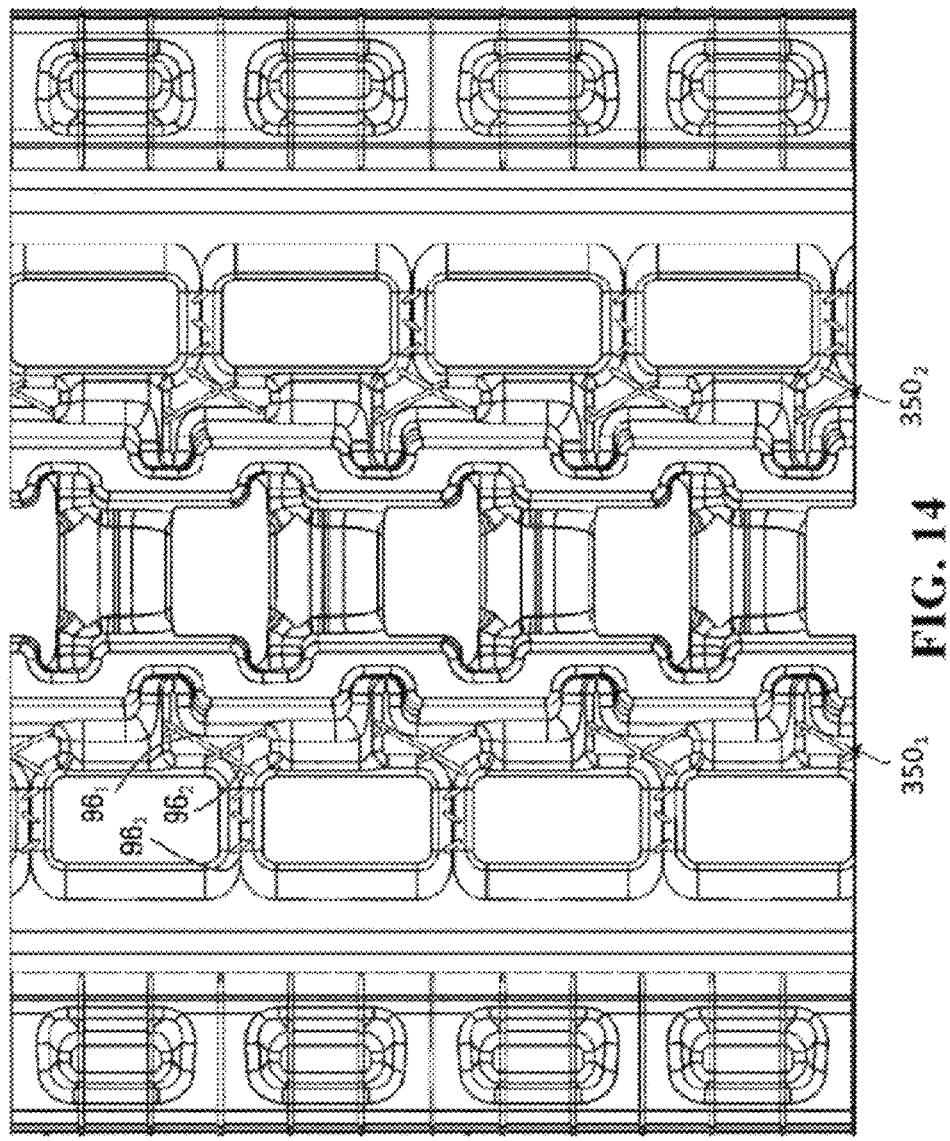

In some embodiments, as shown in FIGS. 12 to 14, the crack-inhibiting elements $372_1$-$372_C$ disposed along the rolling path $330_1$ between successive ones of the cores $344_1$-$344_N$ that succeed one another in the longitudinal direction of the track 322 may comprise elastomeric projections $96_1$-$96_C$ on the inner side 345 of the track 322. Additional elastomeric material of the elastomeric projections $96_1$-$96_C$ may impede crack propagation in the elastomeric material 32. Also shown are the wheel guide 354 and the drive portion 352.

In this embodiment, the elastomeric projections $96_1$-$96_C$ are elongated and can be referred to as "ribs". More particularly, in this embodiment, the elastomeric ribs $96_1$-$96_C$ are elongated transversally to the longitudinal direction of the track 322. Also, in this embodiment, certain ones of the elastomeric ribs $96_1$-$96_C$ intersect one another. In this case, this creates a network or web-like arrangement of the elastomeric ribs $96_1$-$96_C$ that may further impede propagation of cracks in the elastomeric material 32. Furthermore, in this embodiment, certain ones of the elastomeric ribs $96_1$-$96_2$ are disposed between flat areas $98_1$-$98_F$ of the rolling path $330_1$ that are spaced along the longitudinal direction of the track 322 by lower areas $99_1$-$99_L$ so that these elastomeric ribs are disposed in the lower areas $99_1$-$99_L$.

Each elastomeric rib $96_i$ may have any suitable shape. In this embodiment, the elastomeric rib $96_i$ is substantially straight. In other embodiments, the elastomeric rib $96_i$ may be curved, may include straight and curved parts, etc.

The elastomeric rib $96_i$ is shorter than the guide projection $357_1$ of the adjacent one of the cores $344_1$-$344_N$. That is, a height $H_p$ of the elastomeric rib $96_i$, measured normal to a base 97 of the elastomeric rib $96_i$, is less than a height Hg of the guide projection $357_1$ of the adjacent one of the cores $344_1$-$344_N$. For example, in some embodiments, the height $H_p$ of the elastomeric rib $96_i$ may be no more than 15%, in some cases no more than 10%, in some cases no more than 5%, and in some case no more than 2% of the height $H_g$ of the guide projection $357_1$ of the adjacent one of the cores $344_1$-$344_N$. As another example, in some embodiments, the height $H_p$ of the elastomeric rib $96_i$ may be no more than 10%, in some cases no more than 5%, and in some cases at least 2% of the thickness $T_T$ of the track 322. For instance, in some embodiments, the height $H_p$ of the elastomeric rib $96_i$ may be no more than 3 mm, in some cases no more than 2 mm, in some cases no more than 1 mm, in some cases no more than 0.5 mm, and in some cases no more than 0.2 mm. The height $H_p$ of the elastomeric rib $96_i$ may have any other suitable value in other embodiments.

In some embodiments, the elastomeric projections $96_1$-$96_C$ may define a texture of elastomeric material that impedes crack propagation in the elastomeric material 32. That is, the elastomeric projections $96_1$-$96_C$ may be small and spaced by elastomeric recesses of the texture of elastomeric material.

Figure 15:
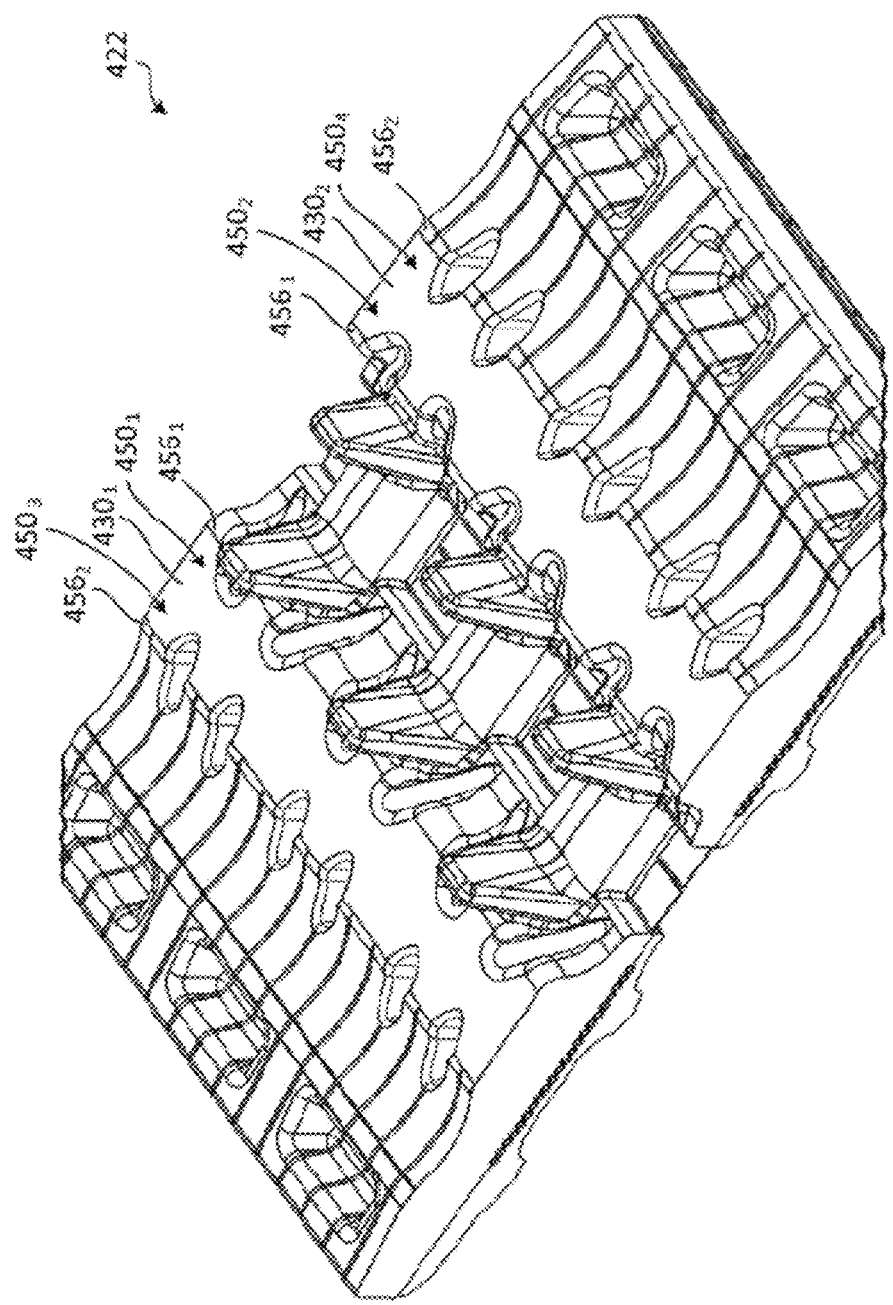
FIG. 15 shows an example of another embodiment of the track.
Figure 16:
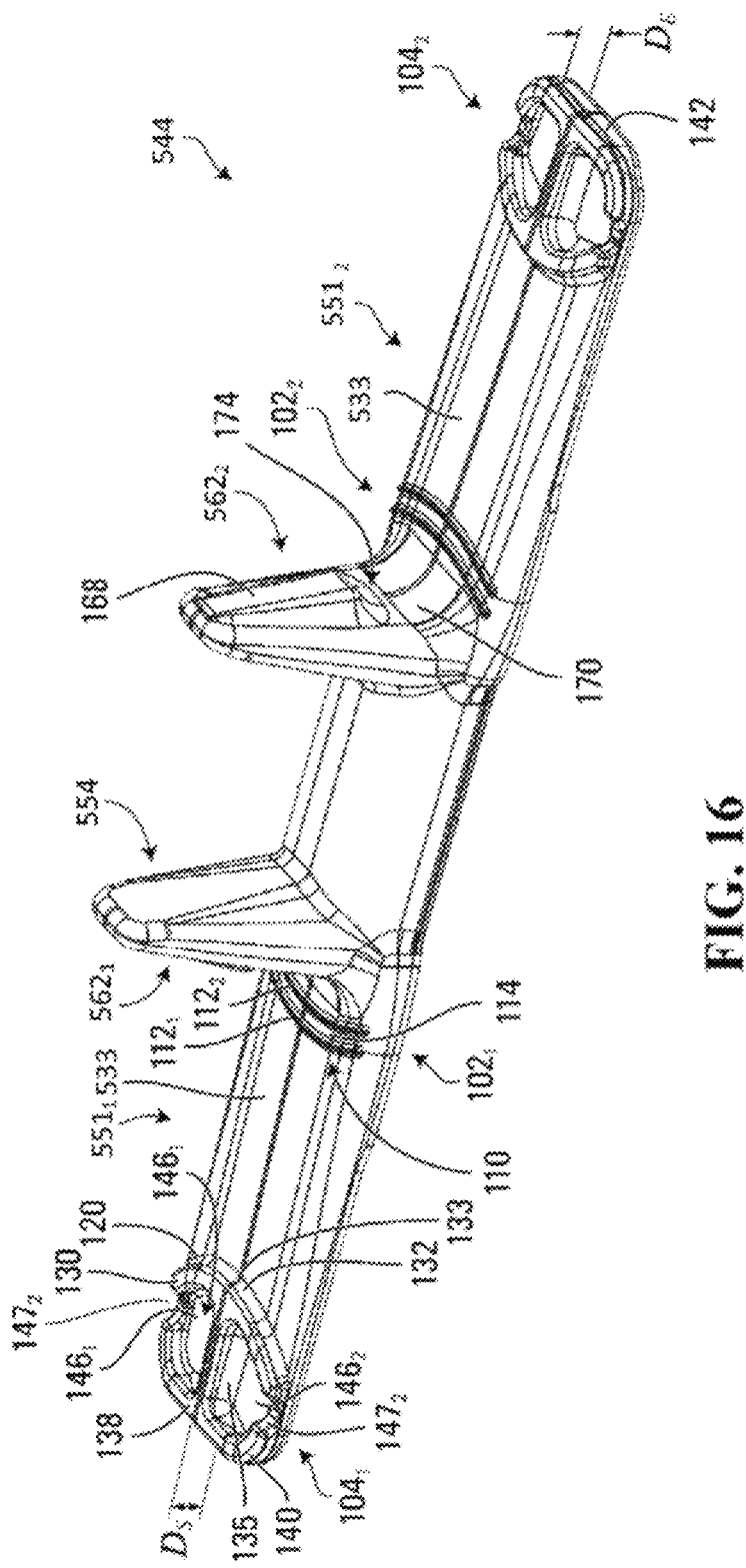
FIGS. 16 and 17 show a perspective view and a top plan view of a core of the track.
Figure 17:
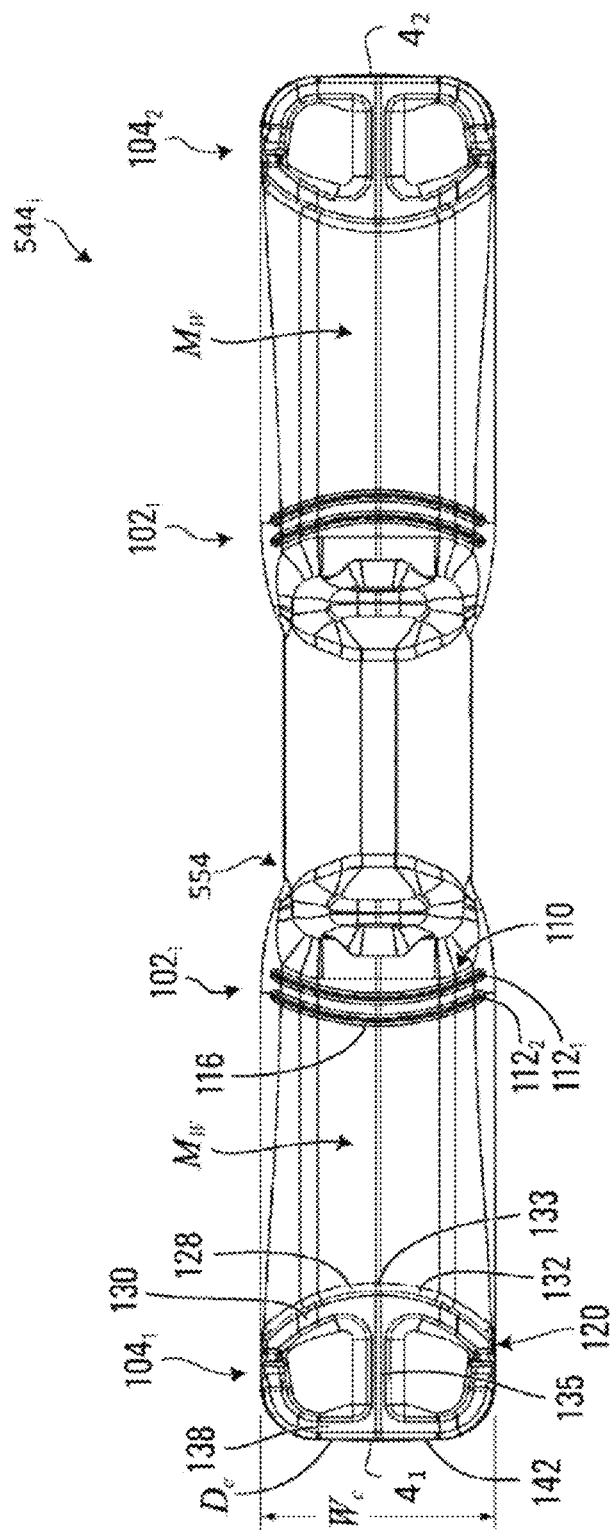
Figure 18:
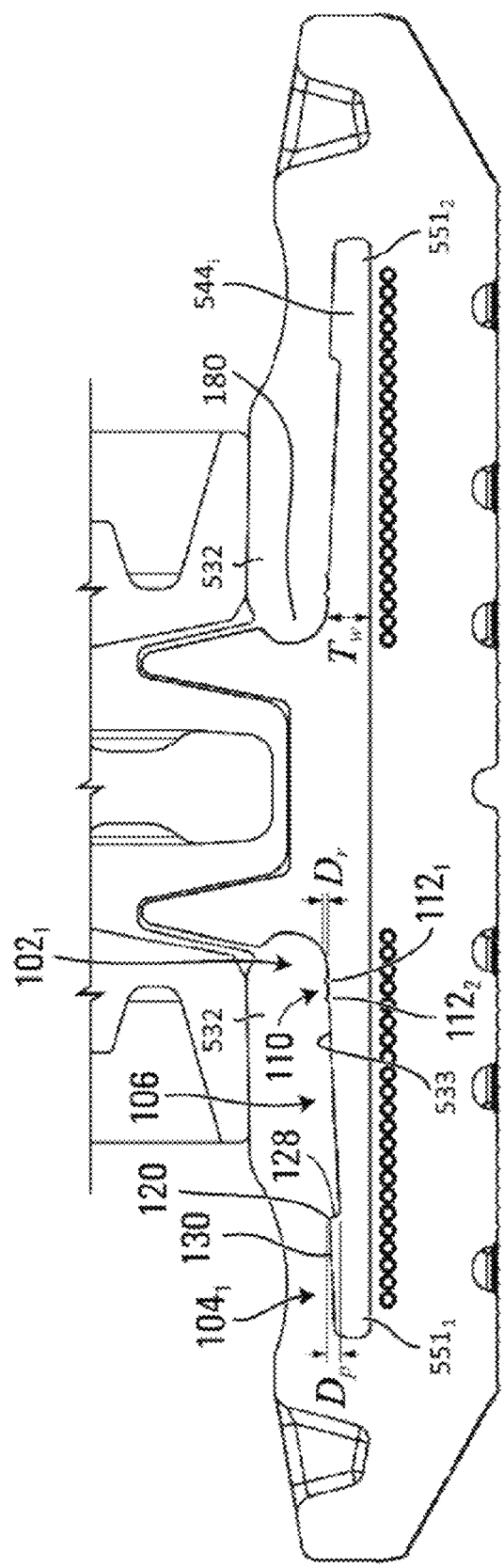
FIGS. 18 and 19 show cross-sectional views of the track, including the core.
Figure 19:
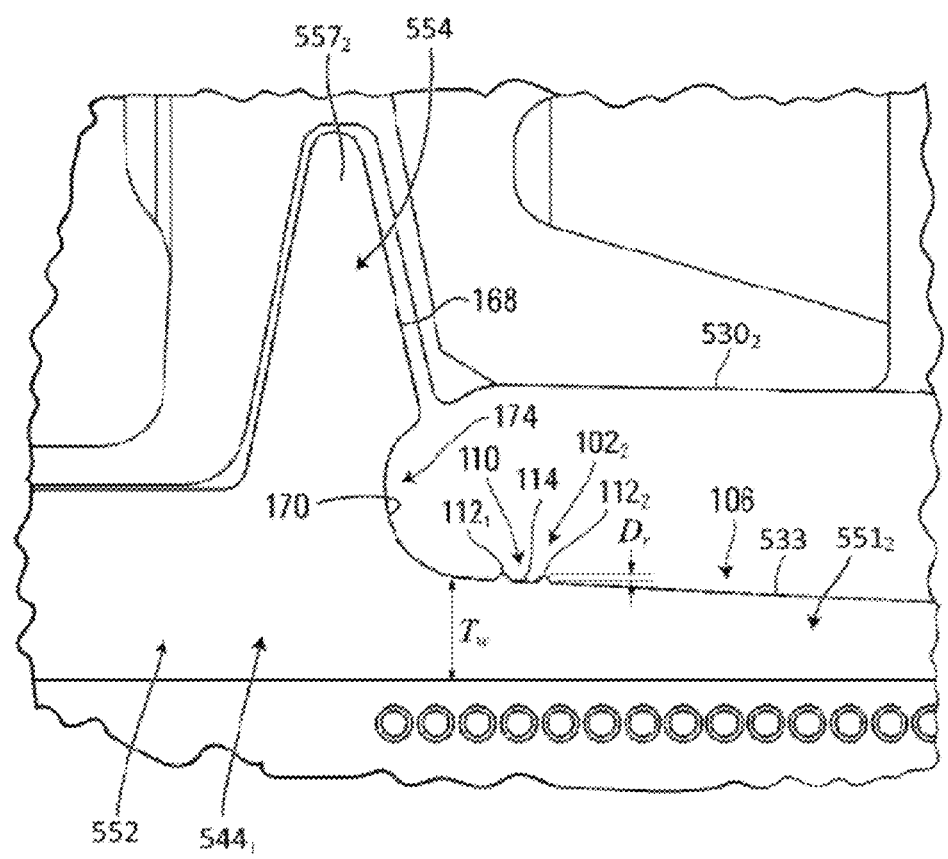

While in embodiments considered above the cracking inhibitors $350_1$, $350_2$ are disposed along the rolling paths $330_1$, $330_2$ adjacent to the inner lateral edge $356_1$ of each of the rolling paths $330_1$, $330_2$, in other embodiments, the cracking inhibitors $350_1$, $350_2$ may be disposed along the rolling paths $330_1$, $330_2$ adjacent to the outer lateral edge $356_2$ of each of the rolling paths $330_1$, $330_2$. Also, in other embodiments, as shown in FIG. 15, in addition to the cracking inhibitors $450_1$, $450_2$ disposed along the rolling paths $430_1$, $430_2$ adjacent to the inner lateral edge $456_1$ of each of the rolling paths $430_1$, $430_2$, the track 422 may comprise cracking inhibitors $450_3$, $450_4$ similar to the cracking inhibitors $450_1$, $450_2$ but disposed along the rolling paths $430_1$, $430_2$ adjacent to the outer lateral edge $456_2$ of each of the rolling paths $430_1$, $430_2$.

2. Delamination Inhibition

In some embodiments, as shown in FIGS. 16 to 19, each core $544_i$ may comprise delamination inhibitors $102_1$, $102_2$, $104_1$, $104_2$ configured to inhibit delamination of the elastomeric material 532 of the track 522 from the wings $551_1$, $551_2$ of the core $544_i$. Each of the delamination inhibitors $102_1$, $102_2$, $104_1$, $104_2$ is a structure of a given one of the wings $551_1$, $551_2$ of the core $544_i$ that is designed to at least reduce (i.e., reduce or prevent) delamination of the elastomeric material 532 of the track 522 from the given one of the wings $551_1$, $551_2$ of the core $544_i$, i.e., help maintain adhesion of the elastomeric material 532 of the track 522 to the given one of the wings $551_1$, $551_2$ of the core $544_i$.

The delamination inhibitors $102_1$, $104_1$ of the wing $551_1$ of the core $544_i$ will be further discussed below, with an understanding that a similar discussion applies to the delamination inhibitors $102_2$, $104_2$ of the wing $551_2$ of the core $544_i$.

As further discussed below, in this embodiment, the delamination inhibitor $102_1$ of the wing $551_1$ of the core $544_i$ is configured to impede passage of grit between the inner surface 533 of the wing $551_1$ and a portion 106 of the elastomeric material 532 of the track 522 contiguous to the inner surface 533 of the wing 5511. In that sense, the delamination inhibitor $102_1$ may be referred to a "grit blocker". Grit, which can include sand, rocks (e.g., gravel), and/or other small granular abrasive objects or other dirt and may be contained in water and/or other liquid (e.g., oil) that forms grit-containing media, from an environment of the vehicle 10 may tend to enter inside the track 522 between its elastomeric material 532 and the core 544; via cracks, holes and/or other wear effects under action of the roller wheels $28_1$-$28_{10}$. Also, in this embodiment, the delamination inhibitor $104_1$ of the wing $551_1$ of the core $544_i$ is configured to oppose shearing of the portion 106 of the elastomeric material 532 of the track 522 relative to the inner surface 533 of the wing $551_1$ under loading from respective ones of the roller wheels $28_1$-$28_{10}$. In that sense, the delamination inhibitor $104_1$ may be referred to as a "shear limiter". The grit blocker $102_1$ and the shear limiter $104_1$ may thus help to reduce or prevent delamination of the portion 106 of the elastomeric material 532 of the track 522 from the inner surface 533 of the wing $551_1$ by helping to maintain adhesion therebetween.

In this embodiment, at least part of the grit blocker $102_1$ of the wing $551_1$ of the core $544_i$ is located adjacent to the wheel guide 554 of the core $544_i$, i.e., closer to the wheel guide 554 than to the longitudinal end $4_1$ of the core $544_i$ in the longitudinal direction of the core $544_i$. More particularly, in this embodiment, at least part of the grit blocker $102_1$ is located adjacent to the guide projection $557_1$ of the core $544_i$. In this example, the grit blocker $102_1$ is entirely located between the guide projection $557_1$ of the core $544_i$ and a midpoint $M_w$ of the wing $551_1$ of the core $544_i$ in the longitudinal direction of the core $544_i$.

The grit blocker $102_1$ of the wing $551_1$ of the core $544_i$ may be implemented in any suitable way. In this embodiment, the grit blocker $102_1$ comprises an unevenness 110 of the inner surface 533 of the wing $551_1$ in the longitudinal direction of the core 544; such that the inner surface 533 of the wing $551_1$ is uneven (i.e., non-flat) in longitudinal direction of the core $544_i$ about the grit blocker $102_1$. The unevenness 110 of the inner surface 533 of the wing $551_1$ comprises one or more grit-blocking recesses and/or one or more grit-blocking projections creating an impediment to passage of grit between the unevenness 110 and the portion 106 of the elastomeric material 532 of the track 522 contiguous to the inner surface 533 of the wing $551_1$.

In this embodiment, the unevenness 110 of the inner surface 533 of the wing $551_1$ of the core $544_i$ comprises grit-blocking projections $112_1$-112R that are spaced apart in the longitudinal direction of the core $544_i$. In this example, a recess 114 can be viewed as being located between adjacent ones of the grit-blocking projections $112_1$-$112_R$.

Each grit-blocking projection $112_x$ of the unevenness 110 of the inner surface 533 of the wing $551_1$ of the core $544_i$ may have any suitable shape. In this embodiment, the grit blocking projection 112, is elongated, and can be referred to as a "ridge". More particularly, in this embodiment, the grit-blocking ridge 112x is elongated transversally to the longitudinal direction of the core $544_i$. Also, in this embodiment, the grit-blocking ridge $112_x$ is curved. In this example, the grit-blocking ridge $112_x$ is curved such that an apex 116 of the grit-blocking ridge $112_x$ extends farther from the wheel guide 554 of the core $544_i$ in the longitudinal direction of the core $544_i$. This may provide stress relief when a given one of the roller wheels $28_1$-$28_{10}$ passes over the core $544_i$. In other embodiments, the grit-blocking ridge $112_x$ may be straight, comprise curved and straight parts, etc.

In this embodiment, the grit-blocking ridge $112_x$ extends over at least a majority (i.e., a majority or an entirety) of a width $W_c$ of the wing $551_1$ where the ridge $112_x$ is located. For example, in some embodiments, the grit-blocking ridge $112_x$ may extend over at least 60%, in some cases at least 75%, and in some cases at least 90% of the width $W_c$ of the wing $551_1$ where the ridge $112_x$ is located.

A dimension Dr of the grit-blocking ridge $112_x$ in the thicknesswise direction of the core $544_i$, which in this case is a height, may be set as desired. For example, in some embodiments, the height Dr of the grit-blocking ridge $112_x$ may be at least 1%, in some cases at least 5%, in some cases at least 10%, and in some cases at least 20% of a thickness Tw of the wing $551_1$ where the ridge $112_x$ is located, and/or may be the height Dr of the grit-blocking ridge $112_x$ may be no more than 20%, in some cases no more than 10%, in some cases no more than 5%, and in some cases no more than 1% of the thickness Tw of the wing $551_1$. For instance, in some embodiments, the height Dr of the grit-blocking ridge $112_x$ may be at least 0.2 mm, in some cases at least 1 mm, in some cases at least 2 mm, in some cases at least 5 mm, and in some cases at least 8 mm, and/or the height Dr of the grit-blocking ridge $112_x$ may be no more than 8 mm, in some cases no more than 5 mm, in some cases no more than 2 mm, and in some cases no more than 1 mm. The height Dr of the grit-blocking ridge $112_x$ may have any other suitable value in other embodiments.

In this embodiment, at least part of the shear limiter $104_1$ of the wing $551_1$ of the core $544_i$ is located adjacent to the longitudinal end $4_1$ of the core $544_i$, i.e., closer to the longitudinal end $4_1$ of the core $544_i$ than to the wheel guide 554 of the core $544_i$ in the longitudinal direction of the core $544_i$. In this example, the shear limiter $104_1$ is entirely located between the longitudinal end $4_1$ of the core $544_i$ and the midpoint $M_w$ of the wing $551_1$ of the core $544_i$ in the longitudinal direction of the core $544_i$.

The shear limiter $104_1$ of the wing $551_1$ of the core $544_i$ may be implemented in any suitable way. In this embodiment, the shear limiter $104_1$ comprises an unevenness 120 of the inner surface 533 of the wing $551_1$ in the longitudinal direction of the core $544_i$ such that the inner surface 533 of the wing $551_1$ is uneven (i.e., non-flat) in longitudinal direction of the core $544_i$ about the shear limiter $104_1$. The unevenness 120 of the inner surface 533 of the wing $551_1$ comprises one or more projections and/or one or more recesses creating an abutment 128 that abuts against the portion 106 of the elastomeric material 532 of the track 522 to limit shearing of the portion 106 of the elastomeric material 532 of the track 522 relative to the inner surface 533 of the wing $551_1$.

In this embodiment, the unevenness 120 of the inner surface of the wing $551_1$ of the core $544_i$ comprises a shear-limiting projection 130 that defines the abutment 128. The shear-limiting projection 130 comprises an inward surface 132 that faces towards the wheel guide 554 of the core $544_i$ and abuts against the portion 106 of the elastomeric material 532 of the track 522. Under loading of respective ones of the roller wheels $28_1$-$28_{10}$, the shear-limiting projection 130 opposes a tendency of the portion 106 of the elastomeric material 532 of the track 522 to shear laterally outwardly relative to the inner surface 533 of the wing $551_1$.

The shear-limiting projection 130 of the shear limiter $104_1$ may have any suitable shape. In this embodiment, the shear-limiting projection 130 is elongated, and can be thus be referred to as a "rib". More particularly, in this embodiment, the shear-limiting rib 130 is elongated transversally to the longitudinal direction of the core $544_i$.

In this embodiment, the inward surface 132 of the shear-limiting rib 130 is uneven (i.e., non-flat) in the widthwise direction of the core $544_i$. This may help to progressively compress the portion 106 of the elastomeric material 532 of the track 522 against the inward surface 132 of the shear-limiting rib 130 as a given one of the roller wheels $28_1$-$28_{10}$ approaches, passes over, moves away from the core $544_i$. For instance, this may help to reduce displacement of the portion 106 of the elastomeric material 532 of the track 522 and/or provide stress relief at a bonding interface between the core $544_i$ and the portion 106 of the elastomeric material 532 of the track 522. In this example, the inward surface 132 of the shear-limiting rib 130 is uneven such that an apex 133 of the surface 132 extends farther from the longitudinal end $4_1$ of the core 544; in the longitudinal direction of the core $544_i$. More particularly, in this embodiment, the inward surface 132 of the shear-limiting rib 130 is curved. In other embodiments, the inward surface 132 of the shear-limiting rib 130 may be straight, comprise curved and straight parts, etc.

In this example, the shear-limiting rib 130 extends over at least the majority of the width $W_c$ of the wing $551_1$ where the shear-limiting rib 130 is located. For instance, in some embodiments, the shear-limiting rib 130 may extend over at least 60%, in some cases at least 75%, and in some cases at least 90% of the width $W_c$ of the wing $551_1$ where the shear-limiting rib 130 is located.

A dimension $D_p$ of the shear-limiting rib 130 in the thicknesswise direction of the core $544_i$, which in this case is a height, may be set as desired. For example, in some embodiments, the height $D_p$ of the shear-limiting rib 130 may be at least 5%, in some cases at least 10%, in some cases at least 20%, and in some cases at least 50% of the thickness Tw of the wing $551_1$ where the shear-limiting rib 130 is located, and/or the height $D_p$ of the shear-limiting rib 130 may be no more than 50%, in some cases no more than 20%, in some cases no more than 10%, and in some cases no more than 10% of the thickness Tw of the wing $551_1$. For instance, in some embodiments, the height $D_p$ of the shear-limiting rib 130 may be at least 0.2 mm, in some cases at least 1 mm, in some cases at least 5 mm, in some cases at least 10 mm, and in some cases at least 15 mm, and/or the height $D_p$ of the shear-limiting rib 130 may be no more than 15 mm, in some cases no more than 10 mm, in some cases no more than 5 mm, and in some cases no more than 1 mm. The height $D_p$ of the shear-limiting rib 130 may have any other suitable value in other embodiments.

In this embodiment, the shear-limiter $104_1$ also comprises a stiffening projection 135 extending transversally to the shear-limiting rib 130 to stiffen the longitudinal end of the core $544_i$ (e.g., against bending under loading of the roller wheels). More particularly, in this embodiment, the stiffening projection 135 is elongated, and can thus be referred to as a "rib". In this example, the stiffening rib 135 is elongated in to the longitudinal direction of the core $544_i$. Thus, in this example, the shear-limiting rib 130 and the stiffening rib 135 are arranged in a generally T-shaped or anchor-shaped configuration.

In this example, the stiffening rib 135 extends over less than the majority of the width $W_c$ of the wing $551_1$ where the stiffening rib 135 is located. For instance, in some embodiments, the stiffening rib 135 may extend over no more than 40%, in some cases no more than 30%, and in some cases no more than 20% of the width Wo of the wing $551_1$ where the stiffening rib 135 is located.

A dimension Ds of the stiffening rib 135 in the thicknesswise direction of the core $544_i$, which in this case is a height, may be set as desired. For example, in some embodiments, the height $D_s$ of the stiffening rib 135 may be at least 5%, in some cases at least 10%, in some cases at least 20%, and in some cases at least 50% of the thickness $T_w$ of the wing $551_1$ where the stiffening rib 135 is located, and/or the height $D_s$ of the stiffening rib 135 may be no more than 50%, in some cases no more than 20%, in some cases no more than 10% of the thickness $T_w$ of the wing $551_1$. For instance, in some embodiments, the height $D_s$ of the stiffening rib 135 may be at least 5 mm, in some cases at least 10 mm, and in some cases at least 15 mm, and/or the height $D_s$ of the stiffening rib 135 may be no more than 15 mm, in some cases no more than 10 mm, and in some cases no more than 5 mm. The height $D_s$ of the stiffening rib 135 may have any other suitable value in other embodiments.

Also, in this embodiment, the shear-limiter 1041 also comprises an end projection 138 that is closest to the longitudinal end $4_1$ of the core $44_i$, i.e., closer to the longitudinal end $4_1$ of the core $44_i$ than the shear-limiting rib 130 and the stiffening rib 135, to form an enlargement 140 of the core 544; that may help to protect the track 522 against "edge-cutting" when, as the vehicle 10 moves on the ground, the lateral edge $49_1$ of the track 522 impacts (i.e., makes contact with) an obstacle on the ground (e.g., a curb, a sidewalk, a rock, an abrupt change in ground level, etc.). For example, in some cases, without the enlargement 140, the longitudinal end $4_1$ of the core 44; may be too sharp and induce stresses in the elastomeric material 532 of the track 522 between the longitudinal end $4_1$ of the core $544_i$ and the lateral edge $49_1$ of the track 522 that may lead to tearing of that elastomeric material.

In this example, the end projection 138 of the core 544; does not extend to the longitudinal end $4_1$ of the core $544_i$, but rather stops before the longitudinal end $4_1$ of the core $544_i$. This results in a step 142 between the end projection 138 and the longitudinal end $4_1$ of the core $544_i$, which may provide a gradual transition to the longitudinal end $54_1$ of the core $544_i$.

In this embodiment, the end projection 138 of the core 544; extends transversally to the stiffening rib 135. More particularly, in this embodiment, the end projection 138 is elongated, and can thus be referred to as a "rib". In this example, the end rib 138 is elongated transversally to the longitudinal direction of the core $544_i$.

In this example, the end rib 138 extends over at least the majority of the width $W_c$ of the wing $551_1$ where the end rib 138 is located. For instance, in some embodiments, the end rib 138 may extend over at least 60%, in some cases at least 75%, and in some cases at least 90% of the width $W_c$ of the wing $551_1$ where the end rib 138 is located.

A dimension $D_e$ of the end rib 138 in the thicknesswise direction of the core $544_i$, which in this case is a height, may be set as desired. For example, in some embodiments, the height $D_e$ of the end rib 138 may be at least 5%, in some cases at least 10%, in some cases at least 20%, in some cases at least 50%, and in some cases 100% of the thickness $T_w$ of the wing $551_1$ where the end rib 138 is located, and/or the height $D_e$ of the end rib 138 may be no more than 80%, in some cases no more than 50%, in some cases no more than 20%, and in some cases no more than 10% of the thickness $T_w$ of the wing $551_1$. The height $D_e$ of the end rib 138 may have any other suitable value in other embodiments.

In this embodiment, the shear-limiter $104_1$ comprises a pair of hollow spaces $146_1$, $146_2$ delimited by the shear-limiting rib 130, the stiffening rib 135, and the end rib 138. In this example, gaps $147_1$, $147_2$ between respective ends of the shear-limiting rib 130 and the end rib 138 result in the hollow spaces $146_1$, $146_2$ being open at front and back sides of the core $544_i$. This may help for weight reduction and/or mechanically interlocking the elastomeric material 532 to the core $544_i$.

In addition to the grit blockers $102_1$, $102_2$ and the shear limiters $104_1$, $104_2$ of the wings $551_1$, $551_2$ of the core $544_i$, in this embodiment, the wheel-facing side $562_1$, $562_2$ of each of the guide projections $557_1$, $557_2$ of the core $544_i$ comprises an upper surface 168 and a lower surface 170 that recedes inwardly from the upper surface 168 to form a recess 174 configured to impede passage of grit between the recess 174 and an adjoining portion 180 of the elastomeric material 532 of the track 522 in the recess 174, such as, for example, as discussed in U.S. Pat. No. 8,590,986, which is incorporated by reference herein. This may further help to retain proper adhesion between the core $44_i$ and the elastomeric material 532 of the track 522.

While in the embodiment considered above the vehicle 10 is a compact track loader, in other embodiments, the vehicle 10 may be any other type of construction vehicle (e.g., a paver, a bulldozer, a backhoe loader, an excavator, a telehandler, etc.) for performing construction work, an agricultural vehicle (e.g., a rice harvester or other harvester) for performing agricultural work, or any other suitable type of vehicle (e.g., a forestry vehicle, etc.). Although operable off paved roads, the vehicle 10 may also be operable on paved roads in some cases. Also, while in the embodiment considered above the vehicle 10 is driven by a human operator in the vehicle 10, in other embodiments, the vehicle 10 may be an unmanned ground vehicle (e.g., a teleoperated or autonomous unmanned ground vehicle).

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A track for traction of a vehicle, the track being mountable around a plurality of wheels that includes a plurality of roller wheels for rolling on a bottom run of the track along a rolling path of the track, the track comprising:
a ground-engaging outer side;
an inner side opposite to the ground-engaging outer side;
elastomeric material allowing the track to flex around the wheels;
a plurality of cores at least partially embedded in the elastomeric material, distributed in a longitudinal direction of the track, extending transversally to the longitudinal direction of the track, and each comprising a guide projection on the inner side of the track for contacting the roller wheels to guide the track; and
a cracking inhibitor disposed along the rolling path, overlapping with one of the guide projections in the longitudinal direction and in a widthwise direction of the track, and configured to inhibit cracking of the elastomeric material at the rolling path, wherein
the cracking inhibitor has a bottom surface with a height that varies, and
the height of the bottom surface is greater at a first portion of the cracking inhibitor between the guide projection and an outer lateral edge of the rolling path in a widthwise direction of the track than a second portion of the track aligned with the guide projection in the widthwise direction of the track.

2. The track of claim 1, wherein the cracking inhibitor is configured to reduce tension and compression of the elastomeric material at the rolling path as the roller wheels move away and towards respective ones of the cores.

3. The track of claim 1, wherein: the wheels include a drive wheel for driving the track; each of the cores comprises a drive portion configured to engage the drive wheel; and at least part of the cracking inhibitor is located between the drive portion of each of the cores and an outer lateral edge of the rolling path in a widthwise direction of the track.

4. The track of claim 1, wherein each of the cores comprises a wheel guide configured to contact the roller wheels to guide the track; and at least part of the cracking inhibitor is located between the wheel guide of each of the cores and an outer lateral edge of the rolling path in a widthwise direction of the track.

5. The track of claim 1, wherein at least part of the cracking inhibitor is located between the guide projection of each of the cores and an outer lateral edge of the rolling path in a widthwise direction of the track.

6. The track of claim 1, wherein at least part of the cracking inhibitor is located in the rolling path.

7. The track of claim 1, wherein the cracking inhibitor is closer to an inner lateral edge of the rolling path than to an outer lateral edge of the rolling path in a widthwise direction of the track.

8. The track of claim 1, wherein: each of the cores comprises a wheel guide configured to contact the roller wheels to guide the track; and the cracking inhibitor overlaps with the wheel guide of each of the cores in a widthwise direction of the track.

9. The track of claim 1, wherein the cracking inhibitor overlaps with each of the cores in the longitudinal direction of the track.

10. The track of claim 1, wherein the cracking inhibitor comprises a plurality of crack-inhibiting elements spaced apart from one another in the longitudinal direction of the track.

11. The track of claim 10, wherein plural ones of the crack-inhibiting elements are disposed along the rolling path between successive ones of the cores that succeed one another in the longitudinal direction of the track.

12. The track of claim 10, wherein: the rolling path is elevated relative an inner lower area and an outer lower area of the inner side of the track between which the rolling path is disposed in a widthwise direction of the track; and at least part of the crack-inhibiting element is located in the inner lower area of the inner side of the track.

13. The track of claim 10, wherein each crack-inhibiting element is a stress reliever configured to relieve stress in the elastomeric material at the rolling path where the stress reliever is located as the roller wheels pass by.

14. The track of claim 13, wherein the stress reliever comprises a void defined by the elastomeric material.

15. The track of claim 14, wherein the void is a recess.

16. The track of claim 15, wherein the recess is a groove.

17. The track of claim 16, wherein the groove is elongated transversally to the longitudinal direction of the track.

18. The track of claim 16, wherein a width of the groove is greater at a first portion of the cracking inhibitor between the guide projection and an outer lateral edge of the rolling path in the widthwise direction of the track than a second portion of the cracking inhibitor aligned with the guide projection in the widthwise direction of the track.

19. The track of claim 14, wherein: the wheels include a drive wheel for driving the track; each of the cores comprises a drive portion configured to engage the drive wheel; and at least part of the void is located between the drive portion of an adjacent one of the cores and an outer lateral edge of the rolling path in a widthwise direction of the track.

20. The track of claim 14, wherein each of the cores comprises a wheel guide configured to contact the roller wheels to guide the track; and at least part of the void is located between the wheel guide of an adjacent one of the cores and an outer lateral edge of the rolling path in a widthwise direction of the track.

21. The track of claim 14, wherein at least part of the void is located between the guide projection of an adjacent one of the cores and an outer lateral edge of the rolling path in a widthwise direction of the track.

22. The track of claim 14, wherein at least part of the void is located in the rolling path.

23. The track of claim 14, wherein the void is closer to an inner lateral edge of the rolling path than to an outer lateral edge of the rolling path in a widthwise direction of the track.

24. The track of claim 14, wherein: each of the cores comprises a wheel guide configured to contact the roller wheels to guide the track; and the void overlaps with the wheel guide of an adjacent one of the cores in a widthwise direction of the track.

25. The track of claim 14, wherein the void overlaps with an adjacent one of the cores in the longitudinal direction of the track.

26. The track of claim 14, wherein the void is molded during molding of the elastomeric material of the track.

27. The track of claim 10, wherein each crack-inhibiting element comprises deformable material that is more easily deformable than a portion of the elastomeric material contiguous to the deformable material.

28. The track of claim 1, wherein: the cracking inhibitor is a first cracking inhibitor located closer to a first lateral edge of the rolling path than to a second lateral edge of the rolling path; and the track comprises a second cracking inhibitor disposed along the rolling path, configured to inhibit cracking of the elastomeric material at the rolling path and located closer to the second lateral edge of the rolling path than to the first lateral edge of the rolling path.

29. The track of claim 1, wherein the height of the bottom surface varies in the longitudinal direction.

30. The track of claim 1, wherein the height of the bottom surface varies in the widthwise direction.

31. A track for traction of a vehicle, the track being mountable around a plurality of wheels that includes a plurality of roller wheels for rolling on a bottom run of the track along a rolling path of the track, the track comprising:
a ground-engaging outer side;
an inner side opposite to the ground-engaging outer side;
elastomeric material allowing the track to flex around the wheels;
a plurality of cores at least partially embedded in the elastomeric material, distributed in a longitudinal direction of the track, extending transversally to the longitudinal direction of the track, and each comprising a guide projection on the inner side of the track for contacting the roller wheels to guide the track; and
a cracking inhibitor disposed along the rolling path, overlapping with one of the guide projections in the longitudinal direction and in a widthwise direction of the track, and configured to inhibit cracking of the elastomeric material at the rolling path, wherein
the cracking inhibitor has a bottom surface with a depth that varies, and
the depth of the bottom surface is greater at a first portion of the cracking inhibitor between the guide projection and an outer lateral edge of the rolling path in a widthwise direction of the track than a second portion of the cracking inhibitor aligned with the guide projection in the widthwise direction of the track.

32. The track of claim 31, wherein the depth of the bottom surface varies in the longitudinal direction.

33. The track of claim 32, wherein the depth of the bottom surface varies in the widthwise direction.

34. A track for traction of a vehicle, the track being mountable around a plurality of wheels that includes a plurality of roller wheels for rolling on a bottom run of the track along a rolling path of the track, the track comprising:
a ground-engaging outer side;
an inner side opposite to the ground-engaging outer side;
elastomeric material allowing the track to flex around the wheels;
a plurality of cores at least partially embedded in the elastomeric material, distributed in a longitudinal direction of the track, extending transversally to the longitudinal direction of the track, and each comprising a guide projection on the inner side of the track for contacting the roller wheels to guide the track; and
a plurality of crack-inhibiting elements spaced apart from one another in the longitudinal direction of the track, disposed between respective ones of the cores in the longitudinal direction of the track, and configured to inhibit cracking of the elastomeric material at the rolling path, wherein
the plurality of crack-inhibiting elements each have a bottom surface with a depth that varies, and
the depth of the bottom surface is greater at a first portion of the crack-inhibiting element between the guide projection and an outer lateral edge of the rolling path in a widthwise direction of the track than a second portion of the crack-inhibiting element aligned with the guide projection in the widthwise direction of the track.

\* \* \* \* \*